(12) United States Patent
Fujita

(10) Patent No.: US 10,979,632 B2
(45) Date of Patent: Apr. 13, 2021

(54) IMAGING APPARATUS, METHOD FOR CONTROLLING SAME, AND STORAGE MEDIUM

(71) Applicant: CANON KABUSHIKI KAISHA, Tokyo (JP)

(72) Inventor: Atsushi Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/413,375

(22) Filed: May 15, 2019

(65) Prior Publication Data

US 2019/0373170 A1 Dec. 5, 2019

(30) Foreign Application Priority Data

May 31, 2018 (JP) .............................. JP2018-104919

(51) Int. Cl.
*H04N 5/232* (2006.01)
*G03B 37/04* (2021.01)
*G06T 3/40* (2006.01)

(52) U.S. Cl.
CPC ......... *H04N 5/23238* (2013.01); *G03B 37/04* (2013.01); *G06T 3/40* (2013.01); *H04N 5/23229* (2013.01); *H04N 5/23245* (2013.01)

(58) Field of Classification Search
CPC ................................................. H04N 5/23238
USPC ......................................................... 348/36
See application file for complete search history.

(56) References Cited

U.S. PATENT DOCUMENTS

| 9,785,201 | B2 | 10/2017 | Elyada et al. |
| 2006/0055764 | A1* | 3/2006 | Gal ..................... H04N 5/23203 347/109 |
| 2008/0118163 | A1* | 5/2008 | Chang ..................... G06T 7/254 382/236 |
| 2014/0132804 | A1* | 5/2014 | Guissin .................. G02B 13/06 348/239 |
| 2014/0218529 | A1* | 8/2014 | Mahmoud .......... H04N 5/23241 348/148 |
| 2018/0154908 | A1* | 6/2018 | Chen ..................... G07C 5/0858 |
| 2018/0324399 | A1* | 11/2018 | Spears ............. H04N 5/232122 |
| 2019/0068868 | A1* | 2/2019 | Lee ......................... H04N 5/144 |
| 2019/0273866 | A1* | 9/2019 | Abalos ............... H04N 5/23222 |

FOREIGN PATENT DOCUMENTS

| CN | 101064065 A | 10/2007 |
| CN | 101183427 A | 5/2008 |
| CN | 101370127 A | 2/2009 |
| CN | 102445681 A | 5/2012 |
| CN | 103200357 A | 7/2013 |

(Continued)

*Primary Examiner* — Anthony J Daniels
(74) *Attorney, Agent, or Firm* — Canon U.S.A., Inc. IP Division

(57) ABSTRACT

An imaging apparatus includes an imaging unit configured to capture an image, a generation unit configured to combine images to generate a panoramic image of a wider range than an imaging range of each image based on a plurality of images captured by the imaging unit while an imaging direction is being changed, a storage unit configured to store the panoramic image generated by the generation unit, and a detection unit configured to compare an image captured by the imaging unit and the generated panoramic image, and detect a change in a scene based on a comparison result.

25 Claims, 20 Drawing Sheets

(56) References Cited

FOREIGN PATENT DOCUMENTS

| | | |
|---|---|---|
| CN | 104902236 A | 9/2015 |
| CN | 105259765 A | 1/2016 |
| CN | 105308947 A | 2/2016 |
| CN | 107231523 A | 10/2017 |
| CN | 107481309 A | 12/2017 |
| CN | 108055431 A | 5/2018 |
| JP | 2010-176570 A | 8/2010 |

* cited by examiner

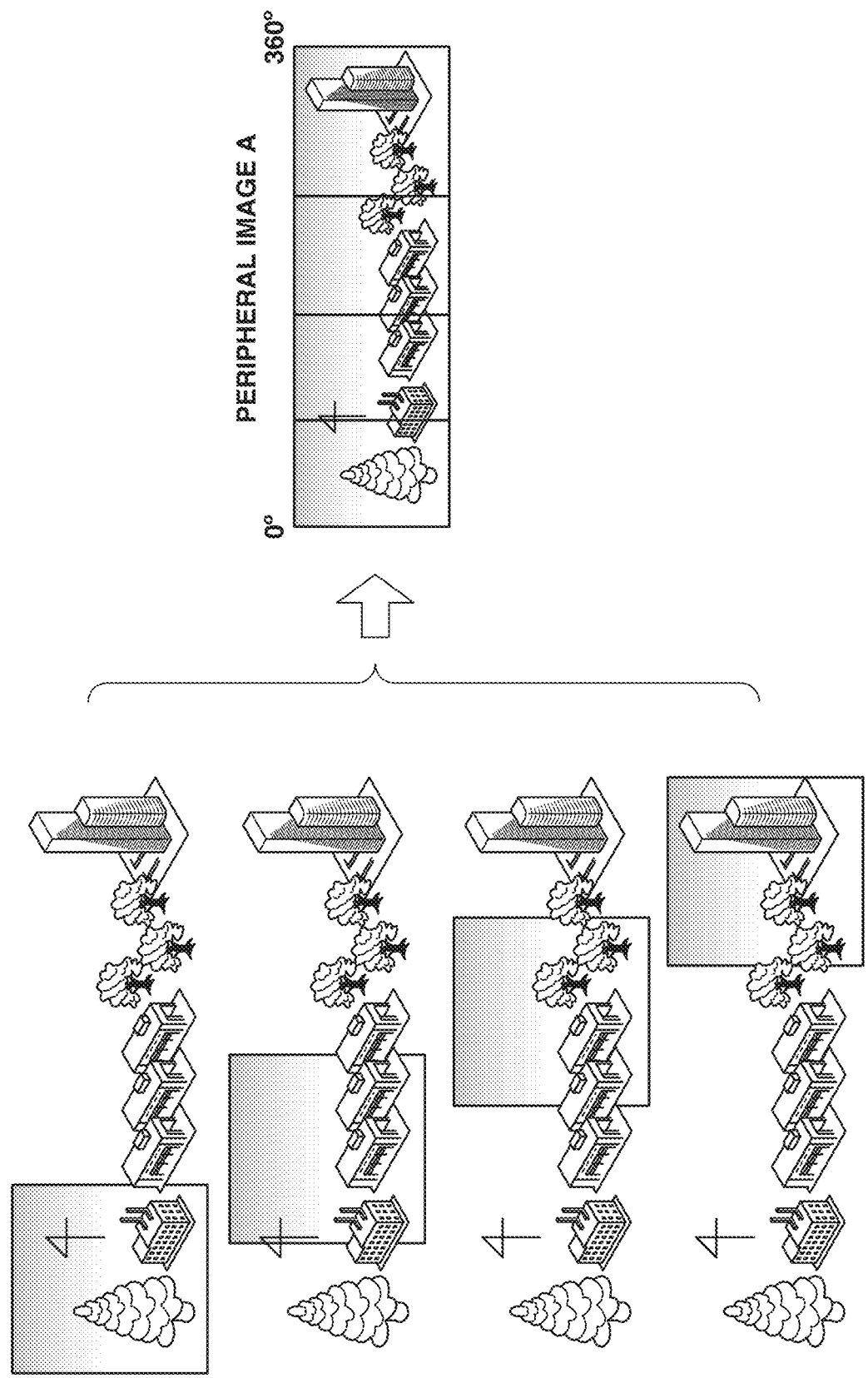

IMAGING APPARATUS, METHOD FOR CONTROLLING SAME, AND STORAGE MEDIUM

BACKGROUND

Field of the Disclosure

The present disclosure generally relates to imaging and, more particularly, to an imaging apparatus, a method for controlling the same, and a storage medium.

Description of the Related Art

A method for comparing a characteristic change between continuously-captured adjoining images (frames) with a predetermined threshold and, if the characteristic change exceeds the threshold, determining that a scene has changed has heretofore been known as a method for detecting a scene change by an imaging apparatus. For example, Japanese Patent Application Laid-Open No. 2010-176570 discusses a technique for classifying images into predetermined motion patterns and detecting an image change between the images based on the pattern classifications.

However, the technique discussed in Japanese Patent Application Laid-Open No. 2010-176570 takes into account only cases where continuously-captured images are compared. For example, some systems adaptively switch between an imaging standby mode capable of quick imaging and a low power consumption mode. In such systems, it has been difficult to efficiently detect a scene change in recovering from the low power consumption mode to the imaging standby mode.

SUMMARY

According to an aspect of the present disclosure, a method for controlling an imaging apparatus includes an imaging unit configured to capture a plurality of images while an imaging direction is being changed. The method includes combining images to generate a panoramic image of a wider range than an imaging range of each image based on the plurality of images, and comparing a first and second panoramic images of different imaging timings and detecting a change in a scene based on a comparison result.

According to another aspect of the present disclosure, a method for controlling an imaging apparatus having a low power consumption mode of reduced power consumption and an imaging standby mode is capable of quick imaging compared to the low power consumption mode. The imaging apparatus includes an imaging unit configured to capture a plurality of images while changing an imaging direction. The method includes determining a change in a scene based on the images, and performing control to perform automatic imaging based on a determination result of the scene, wherein whether to cancel the low power consumption mode is determined based on a comparison result between a first plurality of images captured in shifting from the imaging standby mode to the low power consumption mode and a second plurality of images captured in cancelling the low power consumption mode.

Further features of the present disclosure will become apparent from the following description of exemplary embodiments with reference to the attached drawings.

BRIEF DESCRIPTION OF THE DRAWINGS

FIG. 10 is a diagram related to captured images in entering a low power consumption mode.

DESCRIPTION OF THE EMBODIMENTS

Various exemplary embodiments, features, and aspects of the present disclosure will be described in detail below with reference to the accompanying drawings.

<Configuration of Imaging Apparatus>

Figure 1A:
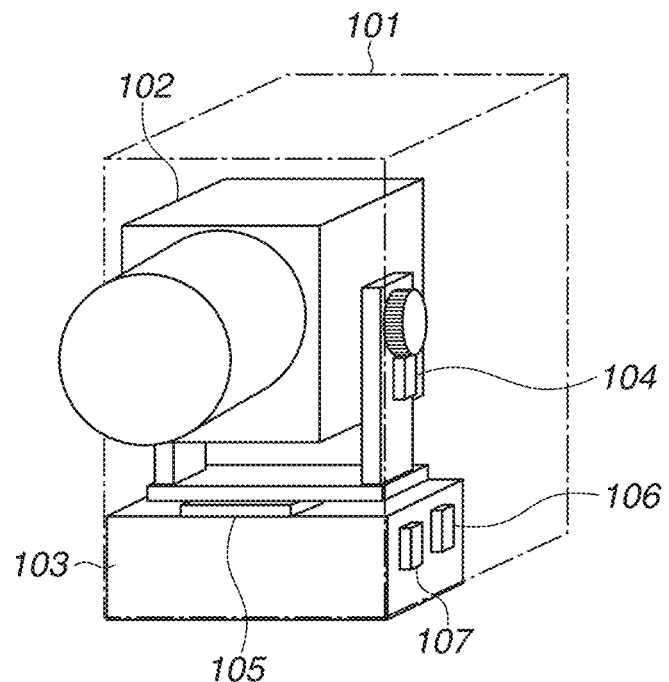
FIGS. 1A and 1B are diagrams schematically illustrating an imaging apparatus.
Figure 1B:
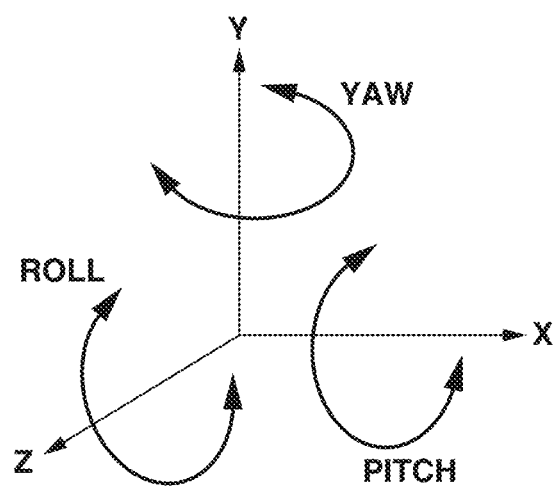

FIGS. 1A and 1B are diagrams schematically illustrating an imaging apparatus.

An imaging apparatus 101 illustrated in FIG. 1A includes an operation member (hereinafter, referred to as a power button, whereas operations, such as a tap, flick, and swipe may be made on a touch panel instead) capable of operating a power switch. A lens barrel 102 is a casing including an imaging lens unit and an image sensor for performing imaging. The lens barrel 102 includes a rotation mechanism that is attached to the imaging apparatus 101 and can drive the lens barrel 102 to rotate with respect to a fixed unit 103. A tilt rotation unit 104 is a motor drive mechanism that can rotate the lens barrel 102 in a pitch direction (tilt direction) illustrated in FIG. 1B. A pan rotation unit 105 is a motor drive mechanism that can rotate the lens barrel 102 in a yaw direction (pan direction). The lens barrel 102 can thus be rotated in one or more axial directions. FIG. 1B illustrates the definitions of the axes at the position of the fixed unit 103. An angular velocity meter 106 and an acceleration meter 107 are both mounted on the fixed unit 103 of the imaging apparatus 101. Vibrations of the imaging apparatus 101 are detected based on the angular velocity meter 106 and the acceleration meter 107. The tilt rotation unit 104 and the pan rotation unit 105 are driven to rotate based on detected vibration angles. With such a configuration, vibrations and tilts of the lens barrel 102, which is a movable part, are corrected.

Figure 2:
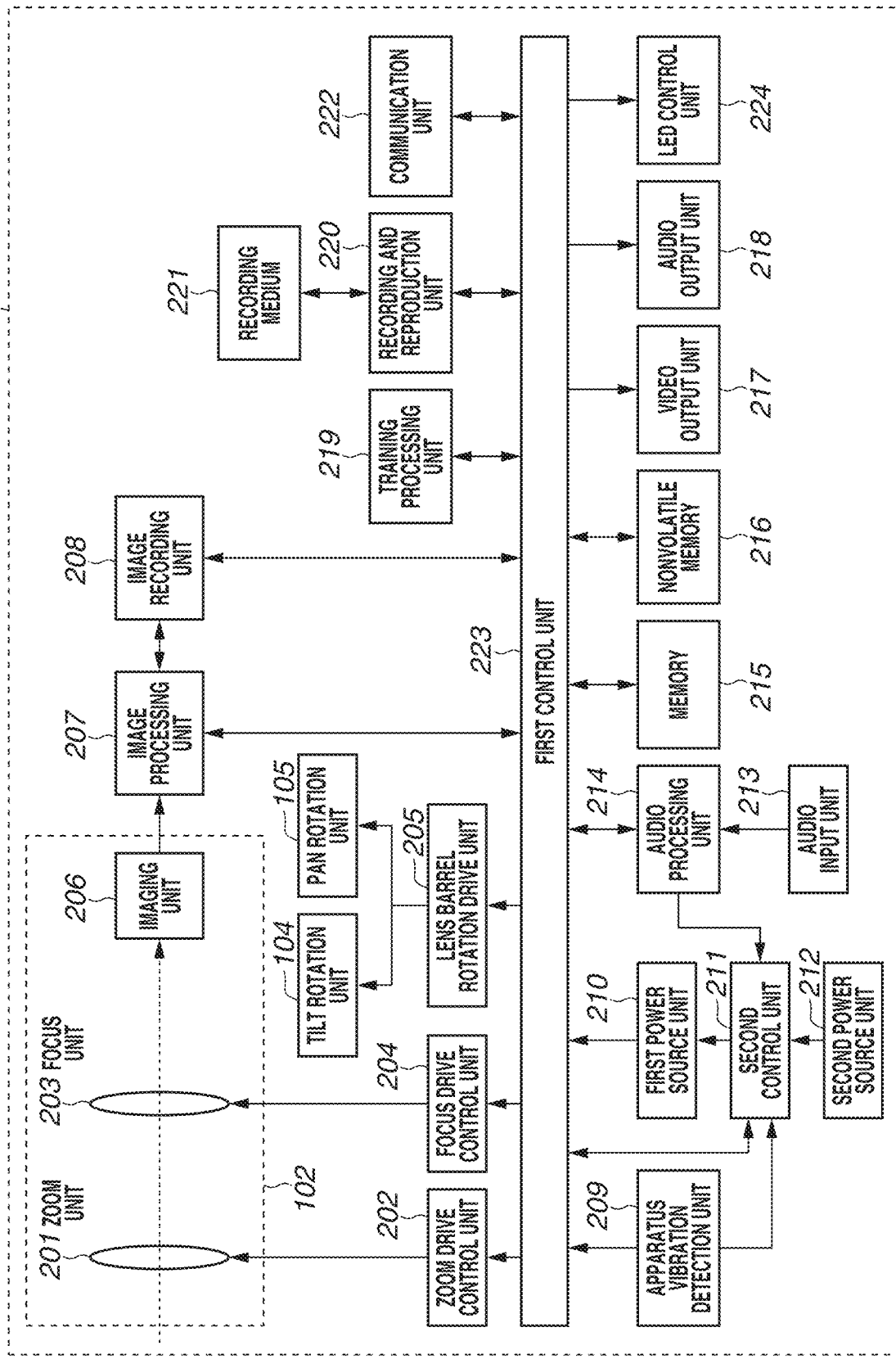
FIG. 2 is a diagram illustrating a configuration of the imaging apparatus.

FIG. 2 is a block diagram illustrating a configuration of the imaging apparatus 101 according to the present exemplary embodiment.

In FIG. 2, a first control unit 223 may include one or more processors (such as a central processing unit (CPU), a graphics processing unit (GPU), a microprocessor, and a microprocessing unit (MPU)), one or more memories (such as a dynamic random access memory (DRAM) and a static random access memory (SRAM)), circuitry, or a combination thereof. Such components may perform various types of processing to control various blocks of the imaging apparatus 101 and control data transmission between the blocks. A nonvolatile memory (electrically erasable programmable read-only memory (EEPROM)) 216 is an electrically erasable and recordable memory. The nonvolatile memory 216 stores operating constants and programs of the first control unit 223.

In FIG. 2, a zoom unit 201 includes a zoom lens for magnification. A zoom drive control unit 202 controls driving of the zoom unit 201. A focus unit 203 includes a lens for focus adjustment. A focus drive control unit 204 controls driving of the focus unit 203.

An image sensor included in an imaging unit 206 receives light incident through the lens units, and outputs charge information based on the amount of light to an image processing unit 207 as analog image data. The image processing unit 207 applies image processing, such as distortion correction, white balance adjustment, and color interpolation processing to digital image data obtained by analog-to-digital (A/D) conversion, and outputs the resulting digital image data. An image recording unit 208 converts the digital image data output from the image processing unit 207 into a recording format, such as a Joint Photographic Experts Group (JPEG) format. The resultant is transmitted to a memory 215 and a video output unit 217 to be described below.

A lens barrel rotation drive unit 205 drives the tilt rotation unit 104 and the pan rotation unit 105 to drive the lens barrel 102 in the tilt and pan directions.

An apparatus vibration detection unit 209 includes the angular velocity meter (gyro sensor) 106 and the acceleration meter (acceleration sensor) 107, for example. The angular velocity meter 106 detects the angular velocity of the imaging apparatus 101 in the three axial directions. The acceleration meter 107 detects the acceleration of the imaging apparatus 101 in the three axial directions. The apparatus vibration detection unit 209 calculates the rotation angle and the amount of shift of the imaging apparatus 101 based on detected signals.

An audio input unit 213 obtains an audio signal around the imaging apparatus 101 from a microphone provided on the imaging apparatus 101, performs A/D conversion, and transmits the resulting digital audio signal to an audio processing unit 214. The audio processing unit 214 performs audio-related processing, such as optimization processing on the input digital audio signal. The first control unit 223 transmits the audio signal processed by the audio processing unit 214 to the memory 215. The memory 215 temporarily stores an image signal and the audio signal obtained by the image processing unit 207 and the audio processing unit 214.

The image processing unit 207 and the audio processing unit 214 read the image signal and the audio signal temporarily stored in the memory 215, and encode the image signal and the audio signal to generate a compressed image signal and a compressed audio signal. The first control unit 223 transmits the compressed image signal and the compressed audio signal to a recording and reproduction unit 220.

The recording and reproduction unit 220 records the compressed image signal and the compressed audio signal generated by the image processing unit 207 and the audio processing unit 214 and other imaging-related control data on a recording medium 221. If the audio signal is not compression-encoded, the first control unit 223 transmits the audio signal generated by the audio processing unit 214 and the compressed image signal generated by the image processing unit 207 to the recording and reproduction unit 220 so that the audio signal and the compressed image signal are recorded on the recording medium 221.

The recording medium 221 may be either a recording medium built in the imaging apparatus 101 or a removable recording medium. The recording medium 221 can record various types of data including the compressed image signal, the compressed audio signal, and the audio signal generated by the imaging apparatus 101. A medium having a larger capacity than that of the nonvolatile memory 216 is typically used. Examples of the recording medium 221 include all types of recording media, such as a hard disk, an optical disk, a magneto-optic disk, a Compact Disc-Recordable (CD-R), a digital versatile disc recordable (DVD-R), a magnetic tape, a nonvolatile semiconductor memory, and a flash memory.

The recording and reproduction unit 220 reads (reproduces) the compressed image signal, the compressed audio signal, the audio signal, various types of data, and programs recorded on the recording medium 221. The first control unit 223 transmits the read compressed image signal and compressed audio signal to the image processing unit 207 and the audio processing unit 214. The image processing unit 207 and the audio processing unit 214 temporarily store the compressed image signal and the compressed audio signal into the memory 215, decode the signals by a predetermined procedure, and transmit the decoded signals to the video output unit 217 and an audio output unit 218.

The audio input unit 213 includes a plurality of microphones installed on the imaging apparatus 101. The audio processing unit 214 can detect the direction of sound on a plane on which the plurality of microphones is installed. The direction of sound is used for a search and/or automatic imaging to be described below. The audio processing unit 214 also detects specific voice commands. The imaging apparatus 101 may be configured so that the user can register specific sounds as voice commands aside from several commands registered in advance. The audio processing unit 214 also performs sound scene recognition. In the sound scene recognition, sound scene determination is performed by using networks trained in advance by machine learning based on large volumes of audio data. For example, networks for detecting specific scenes, such as "raising a cheer", "clapping hands", and "issuing a voice" are set in the audio processing unit 214. The audio processing unit 214 is configured to output a detection trigger signal to the first control unit 223 and a second control unit 211 if a specific sound scene or a specific voice command is detected.

The second control unit 211 is provided separately from the first control unit 223 that controls the entire main system of the imaging apparatus 101. The second control unit 211, which may include one or more processors, one or more memories, circuitry, or a combination thereof, may control power supply to the first control unit 223.

A first power source unit 210 and a second power source unit 212 supply power for operating the first control unit 223 and the second control unit 211, respectively. If the power button provided on the imaging apparatus 101 is pressed, power is initially supplied to both the first control unit 223 and the second control unit 211. As will be described below, the first control unit 223 then controls the first power source unit 210 to turn off its own power supply. Even when the first control unit 223 is not in operation, the second control unit 211 operates and inputs information from the apparatus vibration detection unit 209 and the audio processing unit 214. Based on various types of input information, the second control unit 211 performs processing for determining whether to activate the first control unit 223. The second control unit 211 is configured to issue a power supply instruction to the first power source unit 210 if the first control unit 223 is determined to be activated.

The audio output unit 218 outputs a preset sound pattern from a speaker built in the imaging apparatus 101 during imaging, for example.

A light-emitting diode (LED) control unit 224 controls an LED provided on the imaging apparatus 101 in a preset blink pattern during imaging, for example.

The video output unit 217 includes a video output terminal, for example. The video output unit 217 transmits an image signal for displaying a video image to an external display connected. The audio output unit 218 and the video output unit 217 may be configured as a combined terminal, such as a High-Definition Multimedia Interface (HDMI) (registered trademark) terminal.

A communication unit 222 is used for communication between the imaging apparatus 101 and an external device. For example, the communication unit 222 transmits and receives data on the audio signal, the image signal, the compressed audio signal, and the compressed image signal. The communication unit 222 also receives imaging-related control signals, such as an imaging start command, an imaging end command, and pan, tilt, and zoom drive control signals, and drives the imaging apparatus 101 based on instructions from an external device mutually communicable with the imaging apparatus 101. The communication unit 222 also transmits and receives information, including various types of training-related parameters to be processed by a training processing unit 219 to be described below, between the imaging apparatus 101 and the external device. Examples of the communication unit 222 include wireless communication modules, such as an infrared communication module, a Bluetooth® communication module, a wireless local area network (LAN) communication module, a Wireless Universal Serial Bus (USB) module, and a Global Positioning System (GPS) receiver.

<Configuration with External Communication Device>

Figure 3:
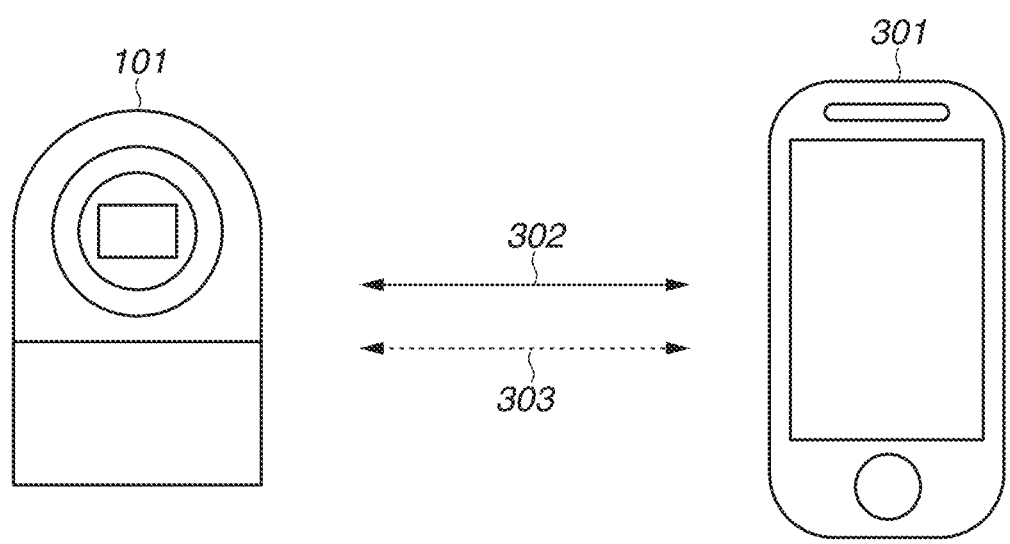
FIG. 3 is a diagram illustrating a configuration of the imaging apparatus and an external device.

FIG. 3 is a diagram illustrating a configuration example of a wireless communication system including the imaging apparatus 101 and an external device (external communication device) 301. The imaging apparatus 101 is a digital camera having an imaging function. The external device 301 is a smart device including a Bluetooth® communication module and a wireless LAN communication module.

The imaging apparatus 101 and the smart device 301 can communicate through communication 302 using, for example, a wireless LAN compliant with the Institute of Electrical and Electronics Engineers (IEEE) 802.11 standard series and through communication 303 having a master-slave relationship between a control station and a subordinate station like Bluetooth® Low Energy. The wireless LAN and Bluetooth® Low Energy are just examples of the communication techniques. Other communication techniques may be used as long as each communication apparatus has two or more communication functions and one of the communication functions can be controlled by using another communication function that performs communication under a control-station-and-subordinate-station relationship. Without impairing generality, a first communication, such as a wireless LAN communication, can be performed faster than a second communication, such as a Bluetooth® Low Energy communication. The second communication may have at least either lower power consumption or shorter communication range than that of the first communication.

Figure 4:
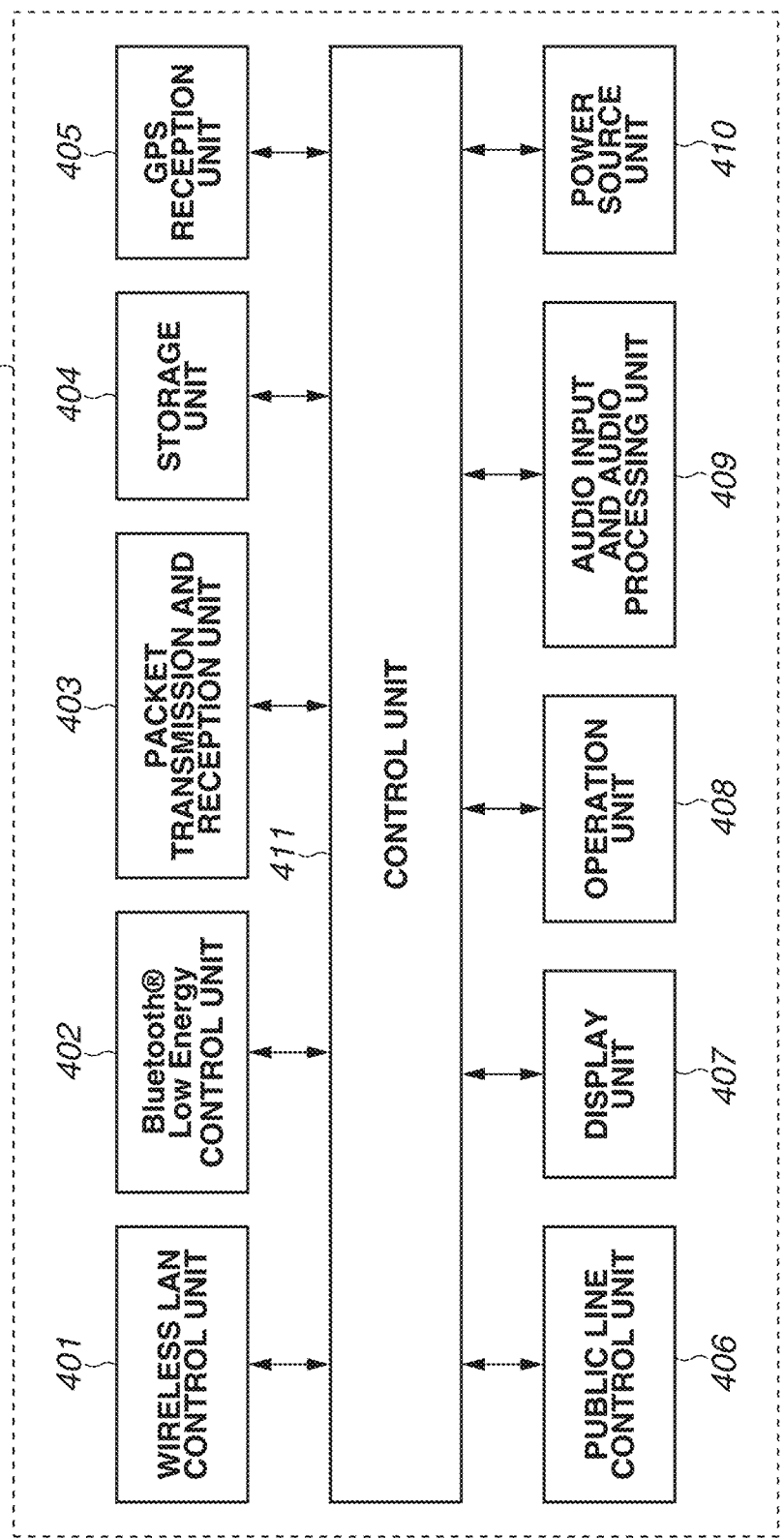
FIG. 4 is a diagram illustrating a configuration of the external device.

A configuration of the smart device 301 will be described with reference to FIG. 4.

For example, the smart device 301 includes a wireless LAN control unit 401 for a wireless LAN, a Bluetooth® Low Energy control unit 402 for Bluetooth® Low Energy, and a public line control unit 406 for public wireless communication. The smart device 301 further includes a packet transmission and reception unit 403. The wireless LAN control unit 401 performs wireless LAN radio frequency (RF) control, communication processing, and protocol processing related to a driver for performing various controls on wireless LAN communication compliant with the IEEE 802.11 standard series and related to the wireless LAN communication. The Bluetooth® Low Energy control unit 402 performs Bluetooth® Low Energy RF control, communication processing, and protocol processing related to a driver for performing various controls on Bluetooth® Low Energy communication and related to the Bluetooth® Low Energy communication. The public line control unit 406 performs public wireless communication RF control, communication processing, and protocol processing related to a driver for performing various controls on public wireless communication and related to the public wireless communication. Examples of the public wireless communication include ones compliant with the International Multimedia Telecommunications (IMT) standard and the Long Term Evolution (LTE) standard. The packet transmission and reception unit 403 performs processing for executing at least either transmission or reception of packets related to wireless LAN communication, Bluetooth® Low Energy communication, and public wireless communication. In the present example, the smart device 301 is described to perform at least either the transmission or reception of packets during communication, whereas other communication schemes, such as circuit switching, may be used aside from packet exchange.

The smart device 301 further includes, for example, a control unit 411, a storage unit 404, a GPS reception unit 405, a display unit 407, an operation unit 408, an audio input and audio processing unit 409, and a power source unit 410. The control unit 411, which may include one or more processors, one or more memories, circuitry, or a combination thereof, may control the entire smart device 301, for example, by executing a control program stored in the storage unit 404. For example, the storage unit 404 stores the control program to be executed by the control unit 411 and various types of information, such as a parameter needed for communication. Various operations to be described below are implemented by the control unit 411 executing the control program stored in the storage unit 404.

The power source unit 410 supplies power to the smart device 301. The display unit 407 has functions capable of, for example, outputting visually recognizable information like a liquid crystal display (LCD) or LED, and outputting sound like a speaker, and displays various types of information. Examples of the operation unit 408 include a button for accepting the user's operation on the smart device 301. The display unit 407 and the operation unit 408 may be configured as a common member, such as a touch panel.

The audio input and audio processing unit 409 may be configured to obtain a voice issued by the user from, for example, a general-purpose microphone built in the smart device 301, and obtain the user's operation command by voice recognition processing.

The audio input and audio processing unit 409 obtains a voice command from a voice issued by the user via a dedicated application in the smart device 301. The audio input and audio processing unit 409 can register the voice command as a specific voice command for the audio processing unit 214 of the imaging apparatus 101 to recognize as one via the wireless LAN communication 302.

The GPS reception unit 405 receives GPS signals notified from satellites, analyzes the GPS signals, and estimates the current position (longitude and latitude information) of the smart device 301. Alternatively, the GPS reception unit 405 may estimate the current position of the smart device 301 based on information about wireless networks near the smart device 301 by using Wi-Fi Positioning System (WPS). If the obtained current GPS position information falls within a position range set in advance (within a range of a predetermined radius), the GPS reception unit 405 notifies the imaging apparatus 101 of movement information via the Bluetooth® Low Energy control unit 402. The movement information is used as a parameter for automatic imaging or automatic editing to be described below. If the GPS position information indicates more than a predetermined amount of change in position, the GPS reception unit 405 notifies the imaging apparatus 101 of the movement information via the Bluetooth® Low Energy control unit 402. The movement information is used as a parameter for the automatic imaging or automatic editing to be described below.

As described above, the smart device 301 exchanges data with the imaging apparatus 101 through communications using the wireless LAN control unit 401 and the Bluetooth® Low Energy control unit 402. For example, the imaging apparatus 101 and the smart device 301 transmit and receive data on the audio signal, the image signal, the compressed audio signal, and the compressed image signal. The smart device 301 also transmits imaging and other operation instructions to the imaging apparatus 101, transmits voice command registration data, and makes a predetermined position detection notification and location movement notification based on the GPS position information. The smart device 301 also transmits and receives training data via the dedicated application in the smart device 301. The external device 301 is not limited to the smart device 301. For example, the external device 301 may be a device dedicated to voice input, with the display unit 407 and the operation unit 408 omitted. This device obtains a voice issued by the user from the foregoing microphone, obtains the user's operation command by voice recognition processing, and notifies the imaging apparatus 101 of the operation command. Such a device may also have a voice recognition function, a cloud communication function, and a news reading function using a speaker. The external device 301 may have a search and voice output function using a search engine and an interactive system function.

<Configuration of Accessories>

Figure 5:
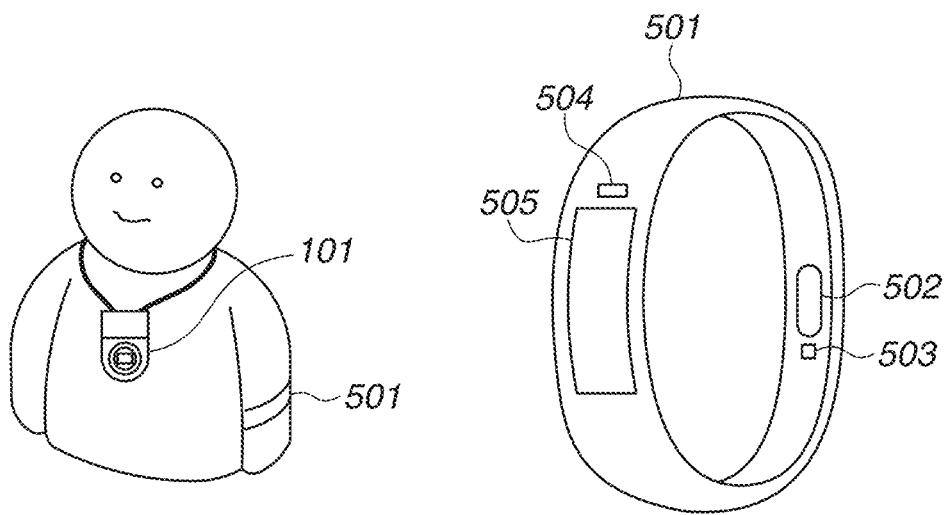
FIG. 5 is a diagram illustrating a configuration of the imaging apparatus and an external device.

FIG. 5 is a diagram illustrating a configuration example of the imaging apparatus 101 and an external device 501 communicable with the imaging apparatus 101. The imaging apparatus 101 is a digital camera having an imaging function. The external device 501 is a wearable device that can communicate with the imaging apparatus 101 by using a Bluetooth® communication module, for example, and includes various sensing units.

For example, the wearable device 501 is configured to be worn on the user's arm. The wearable device 501 includes sensors for detecting the user's living body information such as pulses, heartbeats, and blood flow at predetermined cycles, and an acceleration sensor capable of detecting a motion state of the user.

A living body information detection unit 502 includes, for example, a pulsation sensor for detecting pulses, a heartbeat sensor for detecting heartbeats, a blood flow sensor for detecting a blood flow, and a sensor for sensing the detection of a change in potential through contact of a conductive polymer member with skin. In the present exemplary embodiment, the living body information detection unit 502 will be described by using a heartbeat sensor. The heartbeat sensor detects the user's heartbeats, for example, by irradiating the skin with infrared rays from an LED, detecting infrared rays transmitted through body tissues with a light reception sensor, and performing signal processing. The living body information detection unit 502 outputs the detected living body information as a signal to a control unit 607 to be described below.

A vibration detection unit 503 is intended to detect the motion state of the user. For example, the vibration detection unit 503 includes an acceleration sensor and a gyro sensor, and can detect motions, like whether the user is moving and whether the user is making an arm-swinging action, based on acceleration information.

The wearable device 501 also includes an operation unit 505 for accepting the user's operations on the wearable device 501, and a display unit 504 for outputting visually recognizable information like an LCD or LED.

Figure 6:
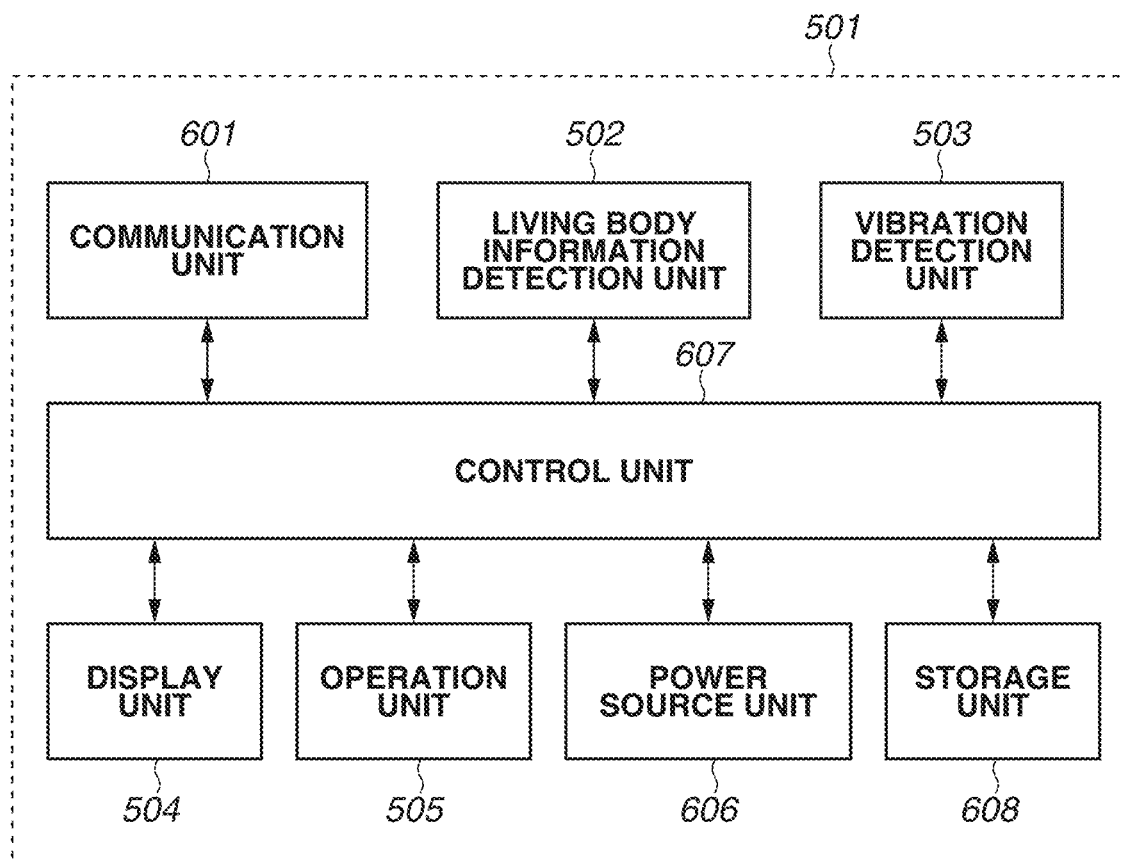
FIG. 6 is a diagram illustrating the external device.

A configuration of the wearable device 501 will be described with reference to FIG. 6.

The wearable device 501 includes, for example, a control unit 607, a communication unit 601, the living body information detection unit 502, the vibration detection unit 503, the display unit 504, the operation unit 505, a power source unit 606, and a storage unit 608.

The control unit 607, which may include one or more processors, one or more memories, circuitry, or a combination thereof, may control the entire wearable device 501, for example, by executing a control program stored in the storage unit 608. The storage unit 608 stores, for example, the control program to be executed by the control unit 607 and various types of information, such as a parameter needed for communication. Various operations to be described below are implemented by the control unit 607 executing the control program stored in the storage unit 608, for example.

The power source unit 606 supplies power to the wearable device 501. The display unit 504 has functions capable of, for example, outputting visually recognizable information like an LCD or LED and outputting sound, such as a speaker, and displays various types of information. Examples of the operation unit 505 include a button for accepting the user's operation on the wearable device 501. The display unit 504 and the operation unit 505 may be configured as a common member, such as a touch panel.

The operation unit 505 may be configured to obtain a voice issued by the user, for example, from a general-purpose microphone built in the wearable device 501, process the voice issued, by the user, through voice processing, and obtain the user's operation command through voice recognition processing.

Various types of detection information from the living body information detection unit 502 and the vibration detection unit 503 are processed by the control unit 607. The communication unit 601 transmits the resulting detection information to the imaging apparatus 101.

For example, the communication unit 601 transmits detection information to the imaging apparatus 101 at timing when a change is detected in the user's heartbeats, and transmits detection information at timing when the motion state changes between, for example, a walking motion, a running motion, and a halt. The communication unit 601 also transmits detection information, for example, at timing when a preset arm swing motion is detected and at timing when a movement over a predetermined distance is detected.

<Imaging Operation Sequence>

Figure 7:
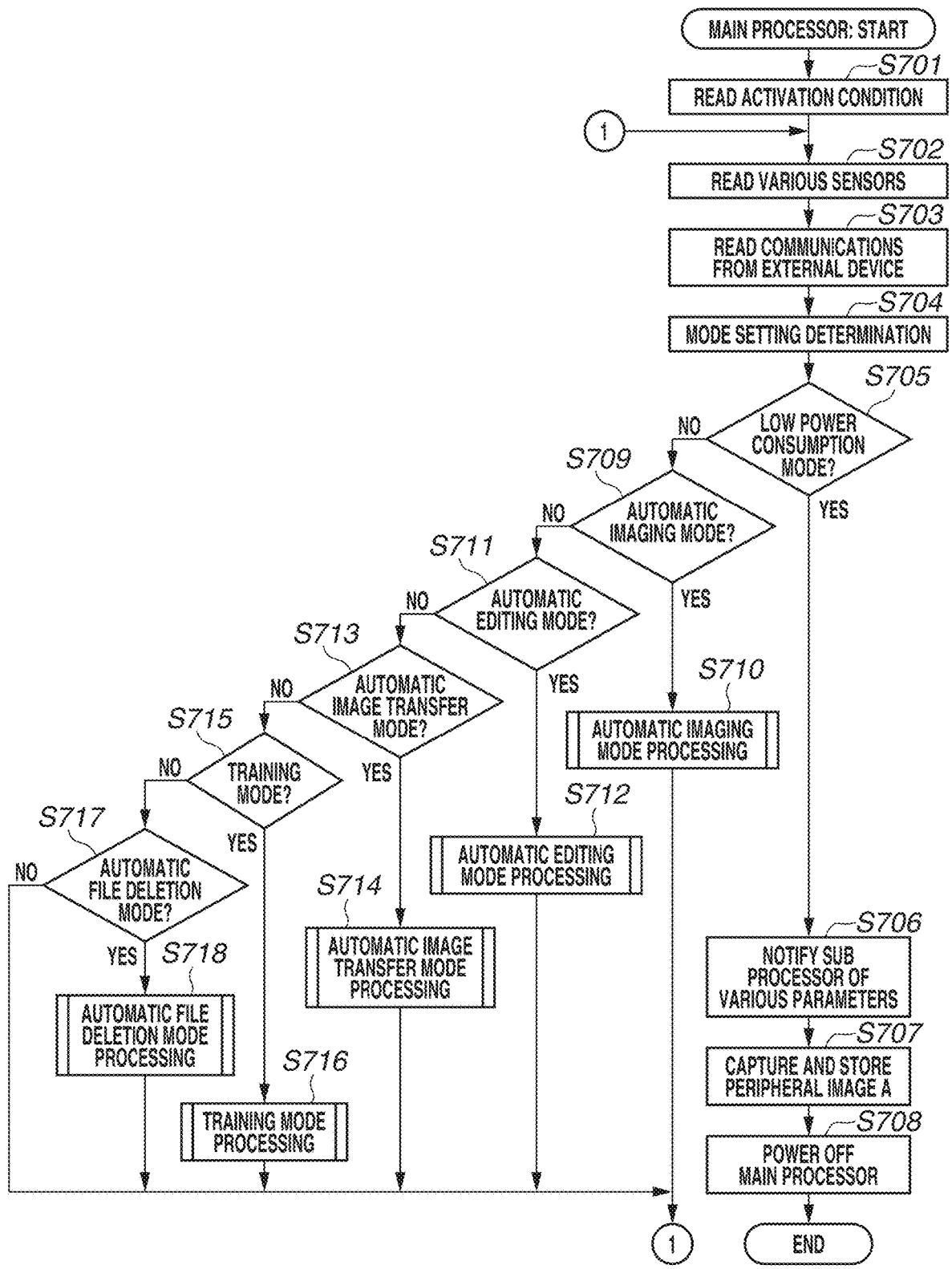
FIG. 7 is a flowchart for illustrating a first control unit.

FIG. 7 is a flowchart for describing an example of operation which the first control unit 223 of the imaging apparatus 101 according to the present exemplary embodiment is in charge of.

If the user operates the power button provided on the imaging apparatus 101, the first power source unit 210 causes a power supply unit to supply power to the first control unit 223 and other blocks of the imaging apparatus 101.

Similarly, the second power source unit 212 causes the power supply unit to supply power to the second control unit 211. Details of operation of the second control unit 211 will be described below with reference to the flowchart of FIG. 8.

The processing of FIG. 7 starts when the power is supplied. In step S701, the first control unit 223 reads an activation condition. In the present exemplary embodiment, possible activation conditions include the following:

(1) Power-on by manually pressing the power button,
(2) Power-on based on an instruction given from an external device (for example, external device 301) through external communication (for example, Bluetooth® Low Energy communication), and
(3) Power-on from a sub processor (second control unit 211).

In the case of (3) power-on from the sub processor, the first control unit 223 reads an activation condition calculated in the sub processor. Details will be described below with reference to FIG. 8.

The activation condition read here is used as a parameter element during an object search or automatic imaging. A description thereof will be given below. After the reading of the activation condition ends, the processing proceeds to step S702.

In step S702, the first control unit 223 reads various sensors. The sensors to be read here may include sensors for detecting vibrations, such as the gyro sensor and acceleration sensor of the apparatus vibration detection unit 209, and sensors related to the rotational positions of the tilt rotation unit 104 and the pan rotation unit 105. The sensors to be read may also include ones related to a sound level detected by the audio processing unit 214, a detection trigger of specific voice recognition, and sound direction detection.

Although not illustrated in FIGS. 1A to 6, the first control unit 223 also obtains information from sensors for detecting environmental information.

Examples include a temperature sensor for detecting temperature around the imaging apparatus 101 at predetermined intervals, and an air pressure sensor for detecting a change in the air pressure around the imaging apparatus 101. An illuminance sensor for detecting brightness around the imaging apparatus 101, a humidity sensor for detecting humidity around the imaging apparatus 101, and an ultraviolet (UV) sensor for detecting the amount of ultraviolet rays around the imaging apparatus 101 may be included. In addition to the detected temperature information, air pressure information, brightness information, humidity information, and/or UV information, the first control unit 223 also uses the rates of changes calculated at predetermined time intervals from the detected various types of information, such as a temperature change amount, an air pressure change amount, a brightness change amount, a humidity change amount, and/or a UV change amount, for automatic imaging and other determinations to be described below.

After the reading of various sensors in step S702, the processing proceeds to step S703.

In step S703, the first control unit 223 detects whether there is a communication instruction from the external device. If there is a communication instruction, the first control unit 223 performs communication with the external device.

For example, the first control unit 223 receives a remote operation from the smart device 301 and transmits and receives data on the audio signal, the image signal, the compressed audio signal, and the compressed image signal via a wireless LAN or Bluetooth® Low Energy communication. The first control unit 223 detects whether there is an imaging or other operation instruction for the imaging apparatus 101, voice command registration data transmitted, a predetermined position detection notification or location movement notification based on GPS position information, or an instruction for transmission and reception of training data from the smart device 301.

For example, if living body information, such as the user's motion information, arm action information, and heartbeats, is updated by the wearable device 501, the first control unit 223 reads the information via Bluetooth® Low Energy communication. The various sensors for detecting the foregoing environmental information may be mounted on the imaging apparatus 100, or mounted on the smart device 301 or the wearable device 501. In the latter case, the first control unit 223 reads the environmental information via Bluetooth® Low Energy communication. After the reading of communications from the external device in step S703, the processing proceeds to step S704.

In step S704, the first control unit 223 performs mode setting determination. The first control unit 223 determines whether various pieces of detection information match any one of mode determination conditions of an "automatic imaging mode", an "automatic editing mode", an "automatic image transfer mode", a "training mode", and an "automatic file deletion mode" to be described below. Such modes are also referred to as imaging standby modes because an image can be captured relatively quickly. If the various pieces of detection information do not match any of the foregoing mode determination conditions, the mode setting is determined to be a low power consumption mode. In the low power consumption mode, the power supply to the image sensor is stopped or suppressed to reduce power consumption, and an image is unable to be quickly captured. In step S705, if the determination result of the foregoing step S704 is the low power consumption mode (YES in step S705), the processing proceeds to step S706. If the determination result is other than the low power consumption mode (NO in step S705), the processing proceeds to step S709.

In step S706, the first control unit 223 notifies the sub processor (second control unit 211) of various parameters (vibration detection determination parameter, sound detection parameter, and time lapse detection parameter) related to activation causes to be determined in the sub processor.

The various parameters are learned and changed in value through training processing to be described below. In step S707, the first control unit 223 captures a peripheral image A of the imaging apparatus 101 and stores the peripheral image A into the memory 215 before entering the low power consumption mode. The stored peripheral image A is used in an algorithm for recovery from the low power consumption mode to be described below.

After the end of the processing of step S707, the processing proceeds to step S708. In step S708, the main processor (first control unit 223) is powered off. The processing ends.

Next, the processing of the mode setting determination (mode setting determination processing) in the foregoing step S704 will be described in detail. Possible mode settings to be determined include the following:

(1) Automatic Imaging Mode
[Mode Determination Condition]

The automatic imaging mode is set if it is determined that automatic imaging is to be performed from various pieces of detection information (image, sound, time, vibration, location, body change, and environmental change) set based on training to be described below, a time elapsed since a transition into the automatic imaging mode, and past imaging information.
[Mode Processing]

In automatic imaging mode processing (step S710), the first control unit 223 automatically searches for an object by pan, tilt, and zoom driving based on various pieces of detection information (image, sound, time, vibration, location, body change, and environmental change). If the first control unit 223 determines that the timing is right for imaging in line with the user's preferences, the first control unit 223 performs processing for determining an imaging method among various imaging methods including single still image capturing, continuous still image capturing, moving image capturing, panoramic imaging, and time lapse imaging. The first control unit 223 then automatically performs imaging.

(2) Automatic Editing Mode
[Mode Determination Condition]

The automatic editing mode is set if it is determined that automatic editing is to be performed from a time elapsed since the previous automatic editing and past captured image information.
[Mode Processing]

In automatic editing mode processing (step S712), the first control unit 223 performs processing for selecting still images and moving images on the basis of training, and performs automatic editing processing for generating a single highlight moving image into which the selected images are summarized by using image effects and taking into account the duration of the edited moving image based on training.

(3) Automatic Image Transfer Mode
[Mode Determination Condition]

If the mode setting is set to the automatic image transfer mode by an instruction given via the dedicated application in the smart device 301 and it is determined that automatic image transfer is to be performed from a time elapsed since the previous image transfer and past captured image information, the automatic image transfer mode is set.
[Mode Processing]

In automatic image transfer mode processing (step S714), the imaging apparatus 101 automatically extracts images that are likely to be preferred by the user, and automatically transmits the extracted images to the smart device 301. The image extraction in line with the user's preferences is performed based on scores to be described below that are determined from the user's preferences and added to the images.

(4) Training Mode
[Mode Determination Condition]

The training mode (automatic training mode) is set if it is determined that automatic training is to be performed from a time elapsed since the previous training processing, information associated with images available for training, and the number of pieces of training data. The training mode is also set if an instruction to set training data is given via communication from the smart device 301.
[Mode Processing]

In training mode processing (step S716), the first control unit 223 performs training for the user's preferences. The training for the user's preferences is performed by using neural networks based on information about operations on the smart device 301 and training information notifications from the smart device 301. Examples of the information about operations on the smart device 301 include information about image acquisition from the imaging apparatus 101, information for which an editing instruction is manually given via the dedicated application, and information about determination values input by the user for images in the imaging apparatus 101.

Detection-related training including personal authentication registration, voice registration, sound scene registration, and normal object recognition registration, and training for the foregoing conditions of the low power consumption mode are also performed at the same time.

(5) Automatic File Deletion Mode
[Mode Determination Condition]

The automatic file deletion mode is set if it is determined that automatic file deletion is to be performed from a time elapsed since the previous automatic file deletion and the remaining capacity of the nonvolatile memory 216 in which images are recorded.
[Mode Processing]

In automatic file deletion mode processing (step S718), the first control unit 223 specifies files to be automatically deleted among the images in the nonvolatile memory 216 (selection processing) based on tag information and the capturing dates and times of the respective images, and deletes the specified files.

Details of the automatic imaging mode processing, the automatic editing mode processing, and the training mode processing will be described below.

In step S705, if it is determined that the mode setting is not the low power consumption mode (NO in step S705), the processing proceeds to step S709. In step S709, the first control unit 223 determines whether the mode setting is the automatic imaging mode. If the mode setting is the automatic imaging mode (YES in step S709), the processing proceeds to step S710. In step S710, the first control unit 223 performs the automatic imaging mode processing. After the end of the automatic imaging mode processing, the processing returns to step S702 for repetition. In step S709, if it is determined that the mode setting is not the automatic imaging mode (NO in step S709), the processing proceeds to step S711.

In step S711, the first control unit 223 determines whether the mode setting is the automatic editing mode. If the mode setting is the automatic editing mode (YES in step S711), the processing proceeds to step S712. In step S712, the first control unit 223 performs the automatic editing mode processing. After the end of the automatic editing mode processing, the processing returns to step S702 for repetition. In step S711, if it is determined that the mode setting is not the automatic editing mode (NO in step S711), the processing proceeds to step S713.

In step S713, the first control unit 223 determines whether the mode setting is the automatic image transfer mode. If the mode setting is the automatic image transfer mode (YES in step S713), the processing proceeds to step S714. In step S714, the first control unit 223 performs the automatic image transfer mode processing. After the end of the automatic image transfer mode processing, the processing returns to step S702 for repetition. In step S713, if it is determined that the mode setting is not the automatic image transfer mode (NO in step S713), the processing proceeds to step S715.

In step S715, the first control unit 223 determines whether the mode setting is the training mode. If it is determined that the mode setting is the training mode (YES in step S715), the processing proceeds to step S716. In step S716, the first control unit 223 performs the training mode processing. After the end of the training mode processing, the processing returns to step S702 for repetition. In step S715, if it is determined that the mode setting is not the training mode (NO in step S715), the processing proceeds to step S717.

In step S717, the first control unit 223 determines whether the mode setting is the automatic file deletion mode. If it is determined that the mode setting is the automatic file deletion mode (YES in step S717), the processing proceeds to step S718. In step S718, the first control unit 223 performs the automatic file deletion mode processing. After the end of the automatic file deletion mode processing, the processing returns to step S702 for repetition. In step S717, if it is determined that the mode setting is not the automatic file deletion mode (NO in step S717), the processing returns to step S702 for repetition.

Figure 8:
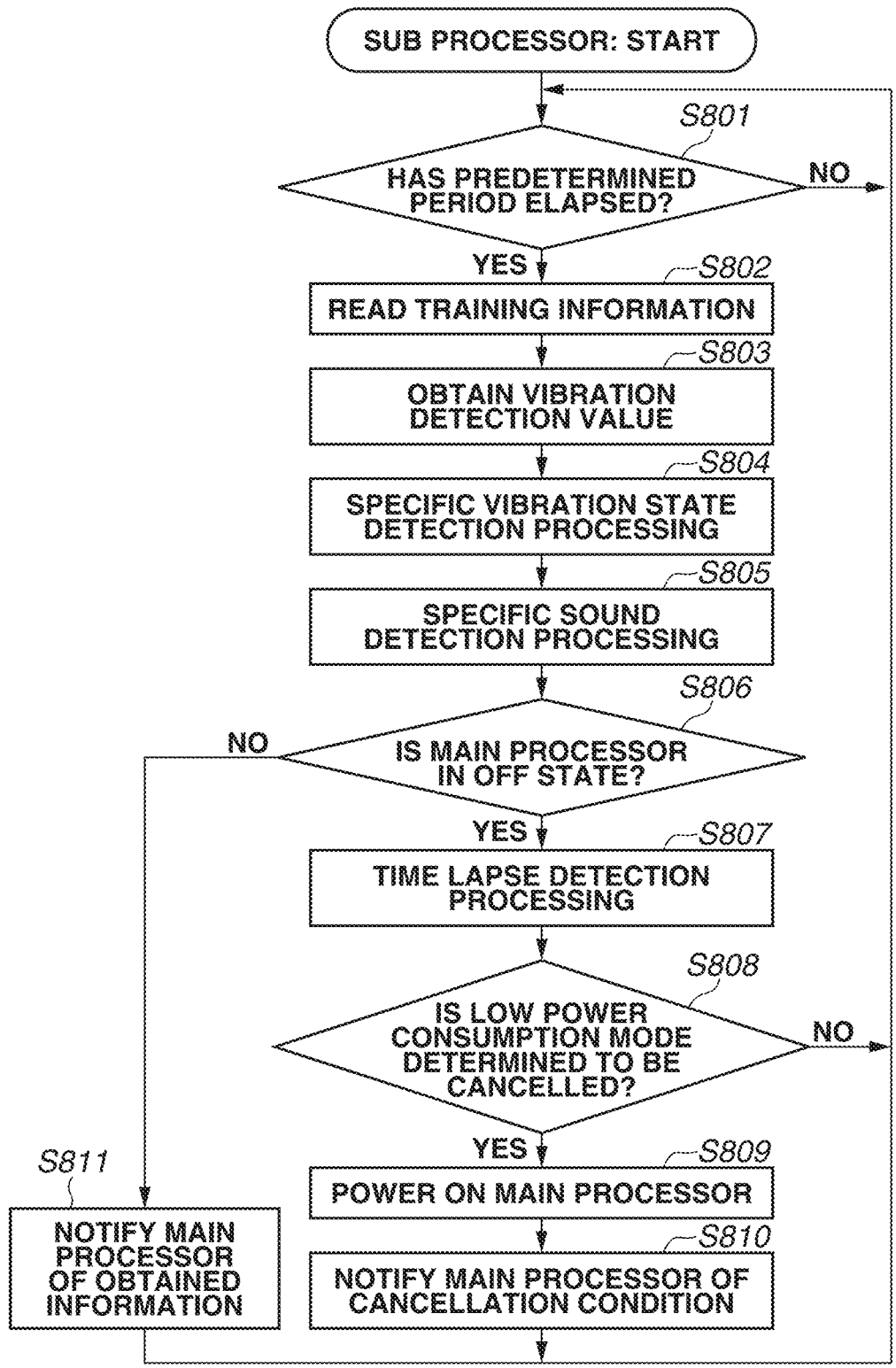
FIG. 8 is a flowchart for illustrating a second control unit.

FIG. 8 is a flowchart for illustrating an example of operation which the second control unit 211 of the imaging apparatus 101 according to the present exemplary embodiment is in charge of.

If the user operates the power button provided on the imaging apparatus 101, the first power source unit 210 causes the power supply unit to supply power to the first control unit 223. The second power source unit 212 similarly causes the power supply unit to supply power to the second control unit 211. The power supply activates the sub processor (second control unit 211) to start the processing of FIG. 8.

In step S801, the second control unit 211 determines whether a predetermined period serving as a sampling cycle has elapsed. For example, if the predetermined period is set to 10 millisecond (msec), the processing proceeds to step S802 (YES in step S801) at cycles of 10 msec. If it is determined that the predetermined period has not elapsed (NO in step S801), the processing returns to step S801 without the sub processor performing any processing. The second control unit 211 then waits for a lapse of the predetermined time.

In step S802, the second control unit 211 reads training information. The training information includes information transferred during the notification of various parameters to the sub processor in step S706 of FIG. 7. Examples of the read information include the following:
(1) Determination condition for specific vibration detection,
(2) Determination condition for specific sound detection, and
(3) Determination condition for time lapse determination.

After the reading of the training information in step S802, the processing proceeds to step S803. In step S803, the second control unit 211 obtains a vibration detection value. The vibration detection value is an output value from a sensor that detects vibrations, such as the gyro sensor and the acceleration sensor of the apparatus vibration detection unit 209.

After the acquisition of the vibration detection value in step S803, the processing proceeds to step S804. In step S804, the second control unit 211 performs preset processing for vibration state detection (specific vibration state detection processing). The second control unit 211 here changes determination processing based on the training information read in step S802. Several examples will be described.

(1) Tap Detection

A state (tap state) in which the user taps the imaging apparatus 101 with a fingertip, for example, can be detected from the output value of the acceleration sensor attached to the imaging apparatus 101. The output (acceleration signal) of the triaxial acceleration sensor is sampled at predetermined intervals and passed through a band-pass filter (BPF) set to a specific frequency domain, whereby a signal region of a change in acceleration based on the tapping can be extracted. Tap detection is performed based on whether the number of times the acceleration signal passed through the BPF exceeds a predetermined threshold ThreshA within a predetermined time TimeA is a predetermined number of times CountA. For a double tap, the predetermined number of times CountA is set to two. For a triple tap, the predetermined number of times CountA is set to three. The predetermined time TimeA and the predetermined threshold ThreshA can also be changed based on the training information.

(2) Detection of Vibration State

The vibration state of the imaging apparatus 101 can be detected from the output value of the gyro sensor or acceleration sensor attached to the imaging apparatus 101. High frequency components of the output of the gyro sensor or acceleration sensor are cut off through a low-pass filter (LPF) and low frequency components are cut off through a high-pass filter (HPF) before absolute value conversion. Vibration detection is performed based on whether the number of times the calculated absolute value exceeds a predetermined threshold ThreshB within a predetermined time TimeB is greater than or equal to a predetermined number of times CountB. This enables, for example, a determination whether the imaging apparatus 101 is in a small vibration state, like when the imaging apparatus 101 is placed on a desk, or in a large vibration state, like when the imaging apparatus 101 is wearable and worn by a walking user. By providing a plurality of conditions about the determination threshold and the number of counts for determination, the vibration state can be finely detected based on vibration levels.

The predetermined time TimeB, the predetermined threshold ThreshB, and the predetermined number of times CountB can also be changed based on the training information.

A method for specific vibration state detection based on conditional determination by the second control unit 211 has been described above. However, a specific vibration state registered in advance can be detected by using a trained neural network by inputting data on the vibration detection sensor sampled within a predetermined time into a neural network-based vibration state classifier. In such a case, the training information read in step S802 is weight parameters of the neural network.

After the specific vibration state detection processing of step S804, the processing proceeds to step S805. In step S805, the second control unit 211 performs specific sound detection processing set in advance. The second control unit 211 here changes detection determination processing based on the training information read in step S802. Several examples will be described.

(1) Detection of Specific Voice Commands

The audio processing unit 214 detects specific voice commands Aside from several commands registered in advance, the user can register a specific voice as a voice command in the imaging apparatus 101.

(2) Recognition of Specific Sound Scenes

The audio processing unit 214 performs sound scene determination by using networks trained in advance through machine learning based on large volumes of audio data. For example, the audio processing unit 214 detects specific scenes, such as "raising a cheer", "clapping hands", and "issuing a voice". The scenes to be detected are changed by training.

(3) Determination of Sound Level

The audio processing unit 214 performs detection based on sound level determination by using a method, such as adding up times in which the magnitude of sound level exceeds a predetermined level value within a predetermined time. The predetermined time and the magnitude of the predetermined level value are changed by training.

(4) Determination of Sound Direction

The audio processing unit 214 can detect the direction of sound on the plane on which the plurality of microphones is installed. The audio processing unit 214 detects the direction of sound with respect to a predetermined magnitude of sound level.

Such detection determination processing is performed inside the audio processing unit 214. In step S805, the second control unit 211 determines whether a specific sound is detected by using the settings trained in advance.

After the specific sound detection processing of step S805, the processing proceeds to step S806. In step S806, the second control unit 211 determines whether the main processor (first control unit 223) is in an off state. If the main processor is in the off state (YES in step S806), the processing proceeds to step S807. In step S807, the second control unit 211 performs time lapse detection processing set in advance. The second control unit 211 here changes detection determination processing based on the training information read in step S802. The training information is the information transferred during the notification of various parameters to the sub processor (second control unit 211), described in step S706 of FIG. 7. A time elapsed since the transition of the main processor from on to off is measured, and if the elapsed time is greater than or equal to a parameter TimeC, it is determined that a predetermined time has elapsed. If the elapsed time is less than the parameter TimeC, it is determined that the predetermined time has not elapsed. The parameter TimeC is changed based on the training information.

After the time lapse detection processing of step S807, the processing proceeds to step S808. In step S808, the second control unit 211 determines whether the low power consumption mode is determined to be cancelled.

Details of an algorithm for determining cancellation of the low power consumption mode will be described with reference to FIGS. 9, 10, and 11.

The cancellation of the low power consumption mode can be triggered by the following three conditions:

(1) Determination condition for specific vibration detection,
(2) Determination condition for specific sound detection, and
(3) Determination condition for time lapse determination.

These three conditions are determined through the specific vibration state detection processing in step S804 of FIG. 8, the specific sound detection processing in step S805, and the time lapse detection processing in step S807, respectively.

Figure 9:
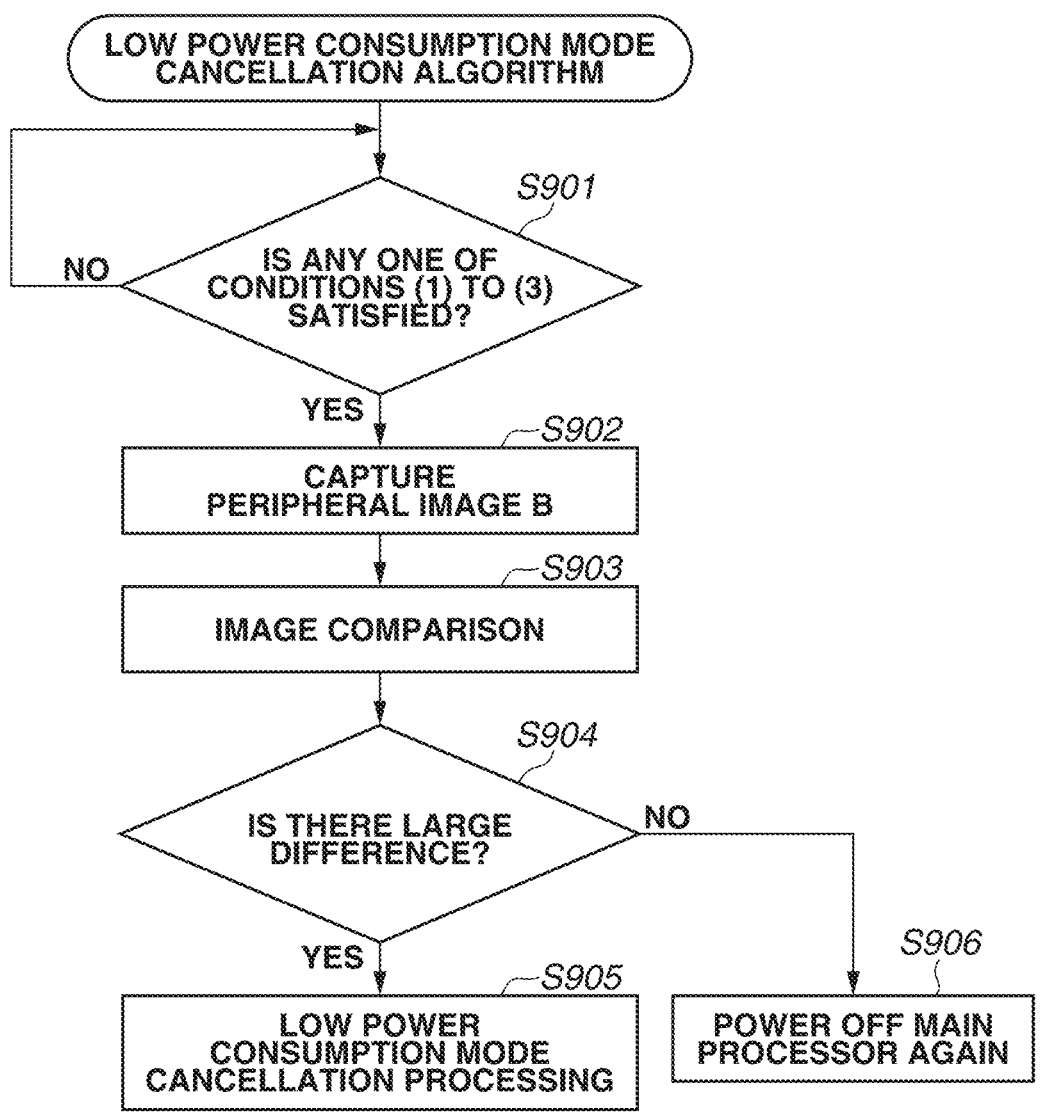
FIG. 9 is a flowchart of a low power consumption mode cancellation algorithm.

In step S901 of FIG. 9, if any one of the foregoing three conditions is satisfied (YES in step S901), the processing proceeds to step S902. In step S902, the second control unit 211 temporarily powers on the main processor to capture a peripheral image B of the imaging apparatus 101.

In step S903, the second control unit 211 performs image comparison between the peripheral image A of the imaging apparatus 101 in entering the low power consumption mode, stored in the foregoing step S707 of FIG. 7, and the foregoing peripheral image B.

As illustrated in FIG. 10, the peripheral image A is stored in the memory 215 in the form of a 360° panoramic image. The 360° panoramic image is obtained by continuously combining a plurality of images captured while the optical system is being rotated in the pan direction, while the plurality of images is being aligned based on overlapping portions. A panoramic image refers to an image of a wider range than the imaging range of each individual image. Information about the azimuth and the tilt angle at which the imaging apparatus 101 is directed in entering the low power consumption mode may be stored as accessory information along with the peripheral image A. The accessory information may be used in the image comparison to be described below.

Figure 11C:
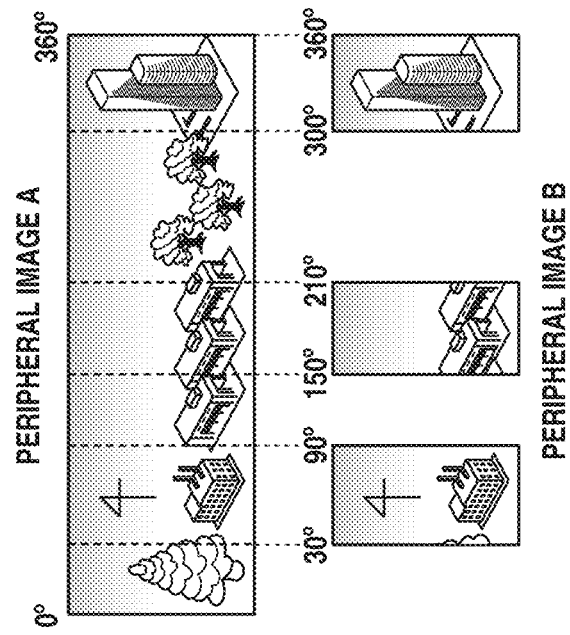
FIGS. 11A, 11B, and 11C each are a diagram related to captured images in making a low power consumption mode cancellation determination.
Figure 11A:
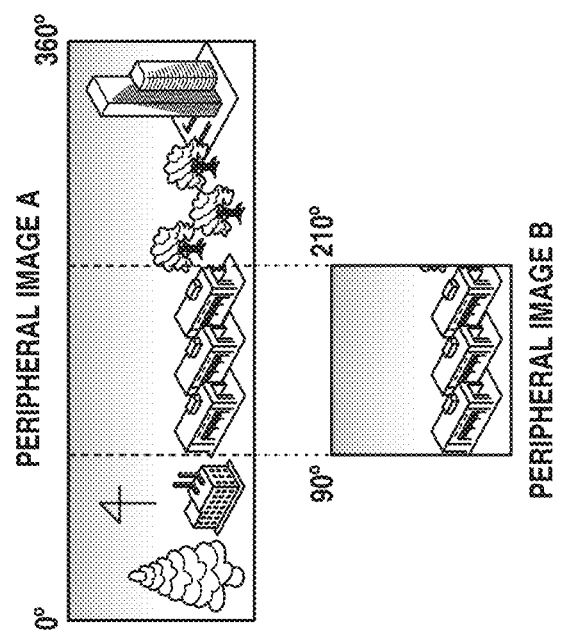

With the peripheral image B captured in step S902, the second control unit 211 calculates a corresponding position of the peripheral image A corresponding to the imaging angle of view of the peripheral image B as illustrated in FIG. 11A by using the foregoing accessory information about the peripheral image A and azimuth information about the azimuth at which the optical system is currently directed. In step S903, the second control unit 211 then performs calculations to determine the sum of differences between the corresponding portion of the peripheral image A and the peripheral image B. If the sum of differences included in difference information between the images exceeds a predetermined threshold, then in step S904, the second control unit 211 determines that there is a large difference between the ambient environment in entering the low power consumption mode and the current ambient environment (YES in step S904). The processing then proceeds to step S905. In step S905, the second control unit 211 performs low power consumption mode cancellation processing.

If the sum of differences between the images does not exceed the predetermined threshold, the second control unit 211 determines that there is no large difference between the ambient environment in entering the low power consumption mode and the current ambient environment (NO in step S904). The processing then proceeds to step S906. In step S906, the second control unit 211 powers off the main processor again to maintain the low power consumption mode.

Figure 11B:
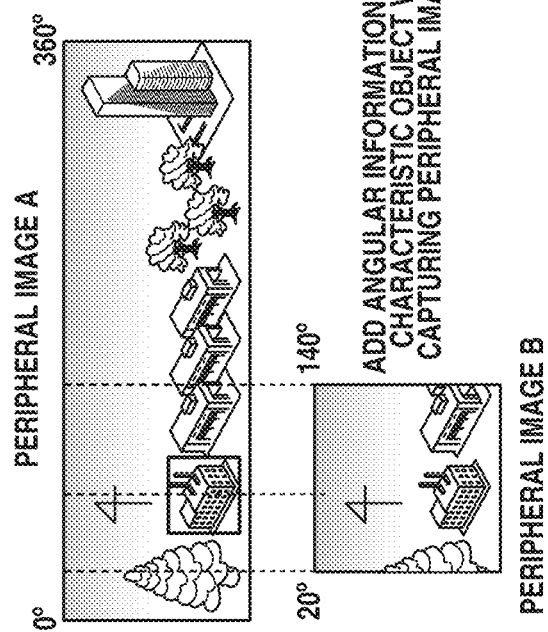

The capturing of the peripheral image B is not limited to once. As illustrated in FIG. 11B, the second control unit 211 may make observations at a plurality of discrete angles of view, and make a determination based on the sum total of differences from the peripheral image A at the respective angles of view. As illustrated in FIG. 11C, the azimuth of a characteristic one of objects included in the peripheral image A may be stored in entering the low power consumption mode, and fed back to the imaging azimuth of the peripheral image B upon recovery determination. Storing the peripheral image A as a panoramic image thus enables quick collation with the peripheral image B of different imaging timing, along with a reduction in the amount of memory to store.

In step S808 of FIG. 8, if the low power consumption mode is determined to be cancelled (YES in step S808), the processing proceeds to step S809. In step S809, the second control unit 211 powers on the main processor. In step S810, the second control unit 211 notifies the main processor of the cancellation condition (vibration, sound, or time) on which the low power consumption mode is determined to be cancelled. The processing return to step S801 to loop.

In step S806, if it is determined that the main processor is in an on state (NO in step S806), the processing proceeds to step S811. In step S811, the second control unit 211 notifies the main processor of the information obtained in steps S803 to S805. The processing then returns to step S801 to loop.

In the present exemplary embodiment, the sub processor is configured to perform the vibration detection and the specific sound detection even when the main processor is in the on state, and notify the main processor of the detection results. However, the sub processor may be configured not to perform the processing of steps S803 to S805 if the main processor is on. In such a case, the vibration detection and the specific sound detection may be performed as internal processing of the main processor (step S702 of FIG. 7).

By performing steps S704 to S707 of FIG. 7 and the processing of FIG. 8 as describe above, the conditions to enter the low power consumption mode and the conditions to cancel the low power consumption mode are learned based on the user's operations. This enables camera operations tailored to usability to the user who owns the imaging apparatus 101. The training method will be described below.

<Automatic Imaging Mode Processing>

The automatic imaging mode processing will be described with reference to FIG. 12.

In step S1201, the first control unit 223 generates an image by subjecting the signal captured by the imaging unit 206 to image processing intended for object detection by the image processing unit 207. The first control unit 223 performs object detection, such as human detection and normal object detection, on the generated image. In the case of human detection, the first control unit 223 detects objects' faces and human bodies.

For face detection processing, patterns for determining a human face are defined in advance. The first control unit 223 can detect an area matching such a pattern in the captured image as a human face image. The first control unit 223 simultaneously calculates a degree of reliability indicating the likelihood of the object being a face. For example, the degree of reliability is calculated from the size of the face area in the image and the degree of matching with a face pattern. For object recognition, objects matching previously-registered patterns can be similarly recognized.

A characteristic object can be extracted by a method using a histogram of hues or color saturations in the captured image. A distribution derived from a histogram of hues or color saturations related to the image of an object captured within an imaging angle of view is divided into a plurality of segments. Processing for classifying the captured image segment by segment is then performed.

For example, the first control unit 223 generates histograms of a plurality of color components in the captured image, segments the image based on convex distribution ranges, classifies the images captured in the areas belonging to the same combination of segments, and recognizes object image areas. The first control unit 223 calculates evaluation values for the respective object image areas recognized, and then can determine that the image area of an object having the highest evaluation value is a main object area. By using such a method, object information about each object can be obtained from imaging information.

In step S1202, the first control unit 223 calculates image vibration correction amounts. More specifically, the first control unit 223 calculates absolute camera angles based on the angular velocity and acceleration information obtained by the apparatus vibration detection unit 209. The first control unit 223 then determines, as the image vibration correction amounts, image stabilization angles to move the tilt rotation unit 104 and the pan rotation unit 105 for in angular directions of compensating the absolute angles. The calculation method for such image vibration correction amount calculation processing can be changed by the training processing to be described below.

In step S1203, the first control unit 223 performs camera state determination. The first control unit 223 determines what vibration/motion state the camera (imaging apparatus 101) is currently in based on a camera angle and the amount of camera movement detected from the angular velocity information, the acceleration information, and the GPS position information.

For example, if imaging is performed with the imaging apparatus 101 mounted on a vehicle, object information about the surroundings changes greatly with the moving distance. The first control unit 223 then determines whether the imaging apparatus 101 is in a "vehicle traveling state" of being mounted on a vehicle and moving at high speed. The determination result can be used for an automatic object search to be described below.

The first control unit 223 determines whether there is a large change in the camera angle, and determines whether the imaging apparatus 101 is in a "stationary imaging state" with little vibration angle. If the imaging apparatus 101 is in the "stationary imaging state", the imaging apparatus 101 itself may be considered to make no angular change. In such a case, a stationary imaging object search can be performed.

If there is a relatively large change in the camera angle, it is determined that the imaging apparatus 101 is in a "handheld state". In such a case, a handheld object search can be performed.

In step S1204, the first control unit 223 performs object search processing. An object search includes the following processing:

(1) Area Segmentation

Figure 16A:
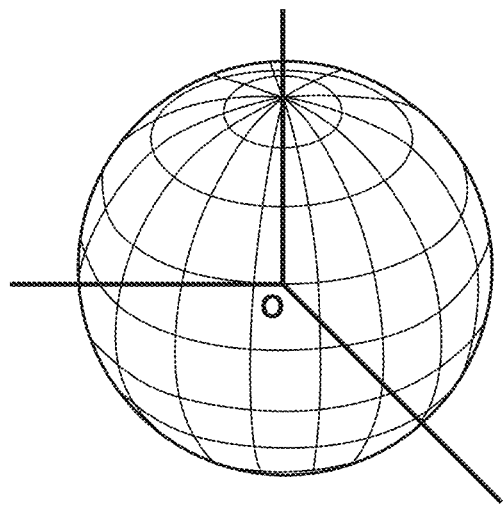
FIGS. 16A to 16D are diagrams for illustrating area segmentation within a captured image.
Figure 16B:
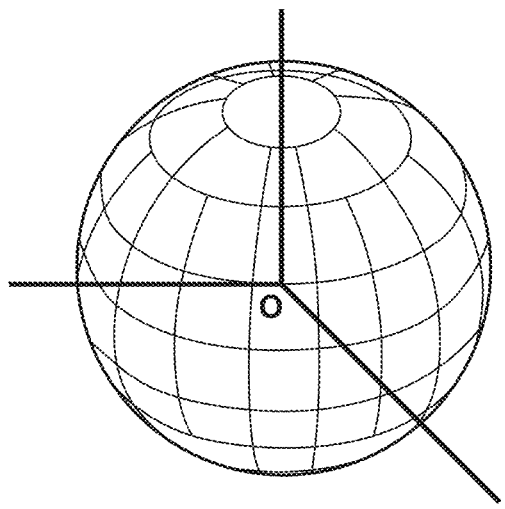
Figure 16C:
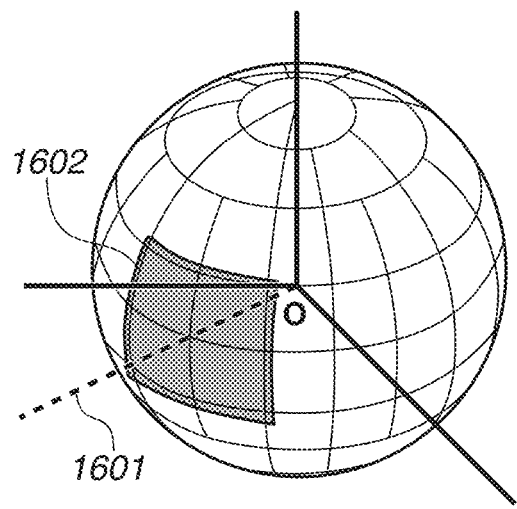
Figure 16D:
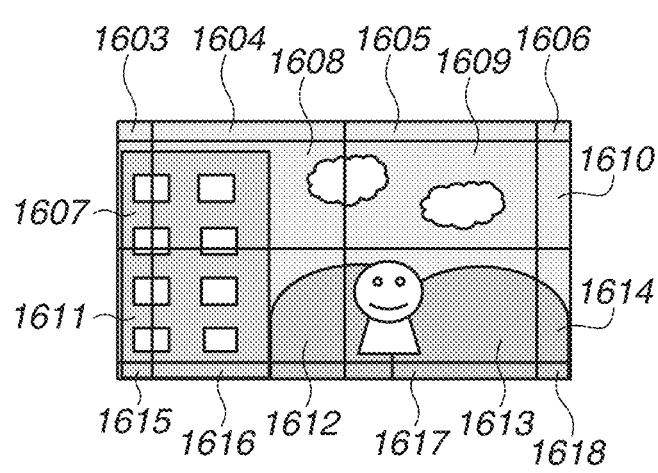

Area segmentation will be described with reference to FIGS. 16A to 16D. As illustrated in FIG. 16A, area segmentation is performed over the entire periphery with the camera position at the center (camera position at a point of origin O). In the example of FIG. 16A, the entire area is segmented in units of 22.5° in both the tilt and pan directions. With the area segmentation illustrated in FIG. 16A, the horizontal circumference decreases and the segments become smaller as the angle in the tilt direction of the camera gets away from 0°. As illustrated in FIG. 16B, the horizontal range of a segment is then set to be greater than 22.5° if the tilt angle is 45° or more. FIGS. 16C and 16D illustrate an example of area segmentation within the imaging angle of view. An axis 1601 represents the direction of the imaging apparatus 101 during initialization. The area segmentation is performed with this direction and angle as a reference position. An angle of view area 1602 represents the angle of view area of the captured image. FIG. 16D illustrates an example of the image here. Based on the area segmentation, the image captured within the angle of view is segmented into areas 1603 to 1618 of FIG. 16D.

(2) Calculation of Importance Level for Each Area

For each of the areas segmented as described above, an importance level indicating order of priority in performing a search is calculated based on an object or objects included in the area and a scene status of the area. For example, an importance level based on an object status is calculated based on the number of persons included in the area, the sizes of the human faces, the directions of the human faces, the reliability of face detection, facial expressions of the persons, and personal authentication results of the persons. For example, an importance level based on a scene status is calculated based on a normal object recognition result, a scene determination result (such as blue sky, backlight, and evening view), the level and a sound recognition result of sound from the direction of the area, and motion detection information within the area. Since the vibration state of the camera is detected by the foregoing camera state determination (step S1203), the importance level can be changed based on the vibration state. For example, if it is determined that the camera is in a "stationary imaging state", the first control unit 223 determines that an object search is to be performed with a particular emphasis on an object having the highest order of priority among objects registered in face authentication (for example, the owner of the camera). Automatic imaging to be described below is also performed with priority given to that face. Even if the owner of the camera wears and carries around the camera for imaging for a long time, many images of the owner can thus be recorded by the owner detaching the camera and placing the camera on, for example, the desk. Since a search can be performed with pan and tilt operations, an image of the owner or a group photo of many faces can be recorded by simply placing the camera without consideration of the placing angle of the camera. With the foregoing conditions alone, the same area would be set as the highest importance level and the area to be searched would always remain the same unless there is a change in the areas. The first control unit 223 then changes the importance levels based on past imaging information. Specifically, the first control unit 223 can decrease the importance level of an area that has been specified as a search area over a predetermined time or decrease the importance level of an area captured in step S1210 to be described below for a predetermined time.

(3) Determination of Search Target Area

After the calculation of the importance levels of the areas as described above, the first control unit 223 determines an area having a high importance level as a search target area. The first control unit 223 then calculates pan and tilt search target angles needed to capture the search target area within the angle of view.

In step S1205, the first control unit 223 performs pan and tilt driving. Specifically, the first control unit 223 calculates pan and tilt driving amounts by adding the image vibration correction amounts to driving angles for control sampling based on the pan and tilt search target angles. The first control unit 223 controls the driving of the tilt rotation unit 104 and the pan rotation unit 105 by using the lens barrel rotation drive unit 205.

In step S1206, the first control unit 223 controls the zoom unit 201 to perform zoom driving. Specifically, the first control unit 223 drives the zoom unit 201 based on the state of a search target object determined in step S1204. For example, if the search target object is a human face, a face with too small size in the image can fail to be detected and can be missed because the face is smaller than a minimum detectable size. In such a case, the first control unit 223 controls the zoom unit 201 to zoom to the telephoto side so that the size of the face in the image increases. If a face in the image is too large, the object can easily go out of the angle of view due to movement of the object or the camera itself. In such a case, the first control unit 223 performs control to cause the zoom unit 201 to zoom to the wide-angle side so that the size of the face in the image decreases. Such zoom control can maintain a state suitable to keep track of the object.

In parallel with the operation of the foregoing steps S1201 to S1206, the first control unit 223 can compare images of different timings obtained at predetermined time intervals, detect a scene change based on the comparison result, and direct the optical system to the area of the scene change.

Figure 20:
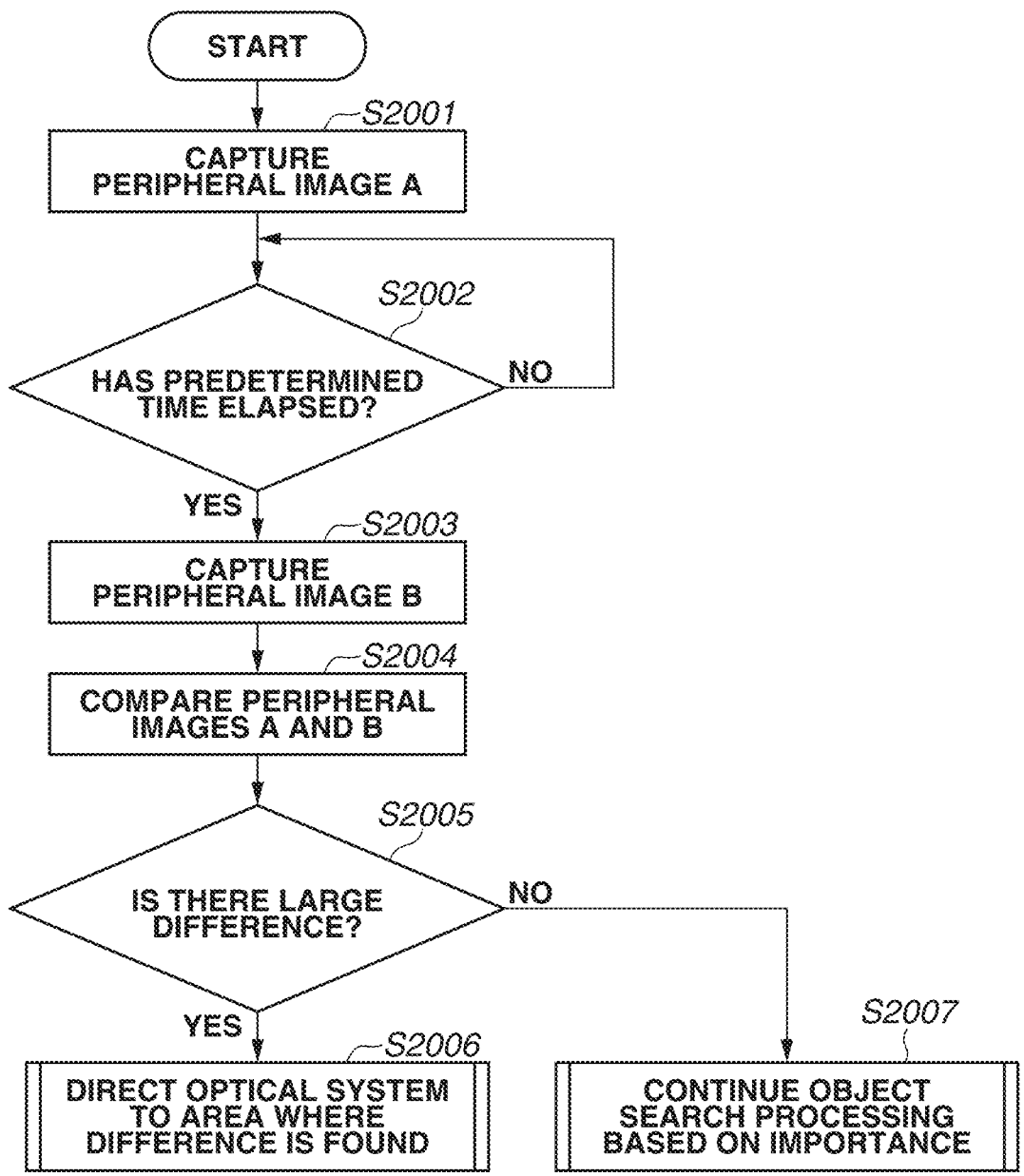
FIG. 20 is a flowchart for illustrating scene change detection processing.

For example, in step S2001 of FIG. 20, the first control unit 223 initially captures a peripheral image A of the imaging apparatus 101 by using the imaging unit 206 at the timing of step S1201. In step S2002, if a condition, such as that a predetermined time has elapsed, is satisfied (YES in step S2002), the processing proceeds to step S2003. In step S2003, the first control unit 223 captures a peripheral image B of the imaging apparatus 101.

In step S2004, the first control unit 223 performs image comparison between the peripheral image A of the imaging apparatus 101 stored in the foregoing step S2001 and the foregoing peripheral image B.

As illustrated in FIG. 10, the peripheral image A is stored in the memory 215 in the form of a 360° panoramic image. The 360° panoramic image is obtained by continuously combining a plurality of images captured while the optical system is being rotated in the yaw direction, while the plurality of images is being aligned based on overlapping portions. Information about the azimuth and the tilt angle at which the imaging apparatus 101 is directed may be stored as accessory information along with the peripheral image A. The accessory information may be used in the image comparison to be described below.

With the peripheral image B captured in step S2003, as illustrated in FIG. 11A, the first control unit 223 calculates a corresponding position of the peripheral image A corresponding to the imaging angle of view of the peripheral image B by using the foregoing accessory information about the peripheral image A and the azimuth information about the azimuth at which the optical system is currently directed. In step S2004, the first control unit 223 performs a calculation to determine the sum of differences between the corresponding portion of the peripheral image A and the peripheral image B. If the sum of differences between the images exceeds a predetermined threshold, then in step S2005, the first control unit 223 determines that there is a large difference between the ambient environment at the timing of step S1201 and the current ambient environment, and the scene has changed (YES in step S2005). The processing then proceeds to step S2006. In step S2006, the first control unit 223 interrupts the object search processing of steps S1201 to S1206, and directs the optical system to the area where the difference is found.

On the other hand, if the sum of differences between the images does not exceed the predetermined threshold, the first control unit 223 determines that there is no large difference between the ambient environment at the time of step S1201 and the current ambient environment (NO in step S2005). The processing then proceeds to step S2007. In step S2007, the first control unit 223 continues the object search processing based on importance area by area, illustrated in steps S1201 to S1206.

In a conventional technique, a scene change has been able to be determined only in the direction at which the imaging apparatus 101 is currently directed. By using the algorithm described above, a scene change around the imaging apparatus 101 can be efficiently determined, and a scene to be captured can be prevented from being missed.

In step S1207, the first control unit 223 determines whether there is a manual imaging instruction. If there is a manual imaging instruction (YES in step S1207), the processing proceeds to step S1210. The manual imaging instruction can be given by a shutter button being pressed, by a finger tap on the camera casing, by input of a voice command, or as an instruction from an external device. An imaging instruction with a tap operation is an imaging instruction method for triggering imaging with continuous high-frequency accelerations in a short period being detected by the apparatus vibration detection unit 209 when the user taps the camera casing. The input of a voice command is an imaging instruction method for triggering imaging with a voice recognized by the audio processing unit 214 when the user pronounces a predetermined imaging instruction phrase (such as "take a picture"). The instruction from an external device is an imaging instruction method in which a shutter instruction signal transmitted from, for example, a smartphone connected to the camera via the dedicated application through Bluetooth® is used as a trigger.

In step S1208, the first control unit 223 performs automatic imaging determination. In the automatic imaging determination, the first control unit 223 determines whether to perform automatic imaging and determines the imaging method (determines which to perform, still image capturing, moving image capturing, continuous shooting, or panoramic imaging).

<Determination Whether to Perform Automatic Imaging>

Figure 15:
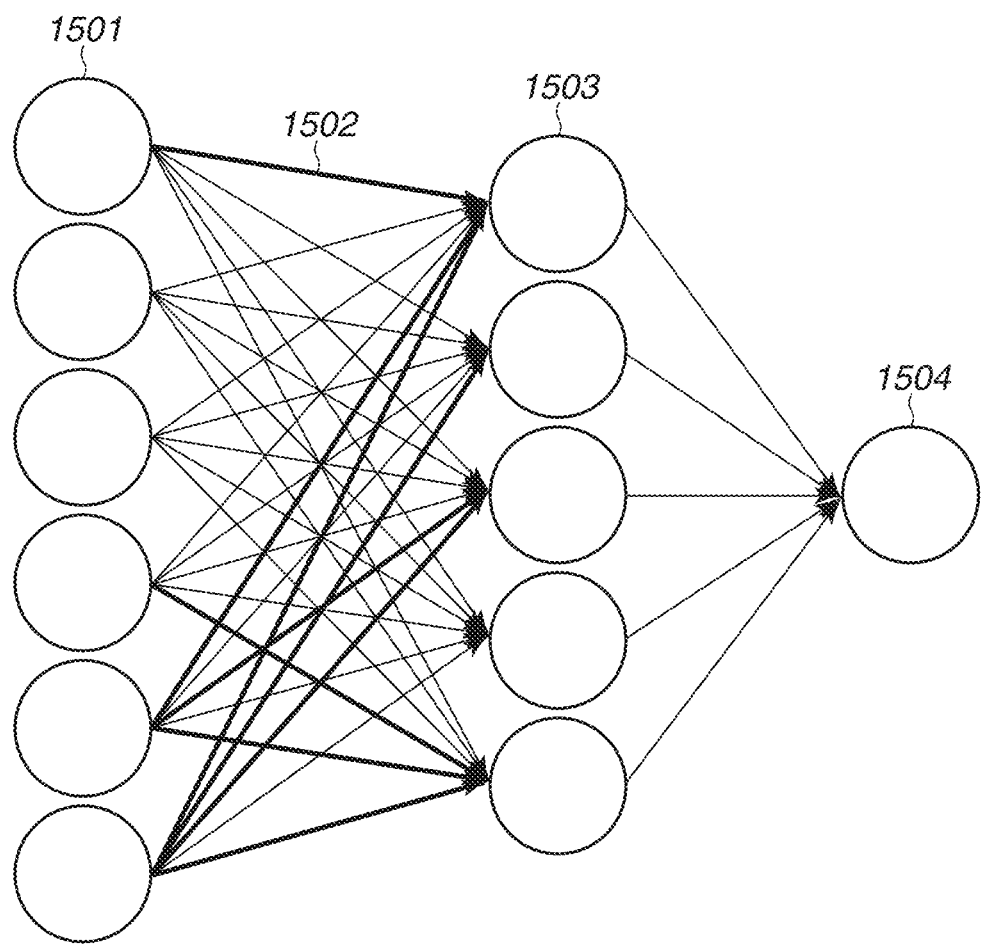
FIG. 15 is a diagram for illustrating a neural network.

Determination as to whether to perform automatic imaging is made based on the following two determinations. One is based on the importance level of each area obtained in step S1204. If the importance level exceeds a predetermined value, the first control unit 223 determines that automatic imaging is to be performed. The other is based on a neural network. FIG. 15 illustrates an example of a multilayer perceptron network as an example of the neural network. The neural network is used to predict an output value from input values. Training the neural network with input values and exemplary output values for the input values in advance enables estimation of an output value emulating a learned example for new input values. The training method will be described below. In FIG. 15, a circle 1501 and circles arranged in a column below represent neurons of an input layer. A circle 1503 and circles arranged in a column below represent neurons of an intermediate layer. A circle 1504 represents a neuron of an output layer. An arrow 1502 and other arrows represent connections between the neurons. In the neural network-based determination, feature amounts based on an object captured in the current angle of view, a scene, and a camera state are supplied to the neurons of the input layer as inputs. The output layer provides an output value through calculations based on a multilayer perceptron forward propagation rule. If the output value is greater than or equal to a threshold, the first control unit 223 determines that automatic imaging is to be performed. Available object features may include the current zoom magnification, a normal object recognition result at the current angle of view, a face detection result, the number of faces captured within the current angle of view, a degree of smile and a degree of closed eyes of a face, a face angle, a face authentication identification (ID) number, and a line of sight angle of a human object. A scene determination result, a time elapsed since the previous imaging, the current time, GPS position information, the amount of change from the previous imaging position, the current audio level, and the presence or absence of a speaking person, handclaps, and cheers may also be used. Vibration information (acceleration information or the foregoing camera state) and environmental information (such as temperature, air pressure, illuminance, humidity, and the amount of UV rays) are further used. If there is information notified from the wearable device 501, the notified information (user's motion information, arm action information, and living body information, such as heartbeats) are also used as features. Such features are converted into numerical values of predetermined ranges, and the numerical values are supplied to the respective neurons of the input layer as feature amounts. The input layer therefore needs to include neurons as many as the number of feature amounts used.

The output value of the neural network-based determination can be changed and the determination result can be adjusted to a training result by the connection weights between the neurons being changed through the training processing to be described below.

The determination as to whether to perform automatic imaging also changes depending on the activation condition of the main processor read in step S702 of FIG. 7. For example, if the main processor is activated by tap detection or by a specific voice command, the operation is highly likely to be made because the user wants to capture an image at the moment. The neural network is then trained to increase the imaging frequency in such cases.

<Determination of Imaging Method>

In determining the imaging method, the first control unit 223 determines which to perform, still image capturing, moving image capturing, continuous shooting, or panoramic imaging, based on the state of the camera and the states of surrounding objects detected in steps S1201 to S1204. For example, if an object (person) remains still, still image capturing is performed. If an object is moving, moving image capturing or continuous shooting is performed. If there is a plurality of objects around the camera, panoramic imaging processing for generating a panoramic image by images successively captured being combined while pan and tilt driving is being operated may be performed. If the imaging site is found to be a scenic spot based on the foregoing GPS information, the panoramic imaging processing for generating a panoramic image by images successively captured being combined while pan and tilt driving is being operated may be performed. As in the determination method described in the <Determination Whether to Perform Automatic Imaging> section, the imaging method may be determined by using neural network-based determination on various types of information detected before imaging. The determination conditions of the determination processing can be changed through the training processing to be described below.

In step S1209, if it is determined that automatic imaging is to be performed based on the automatic imaging determination of step S1208 (YES in step S1209), the processing proceeds to step S1210. If not (NO in step S1209), the automatic imaging mode processing ends.

In step S1210, the first control unit 223 starts automatic imaging. The first control unit 223 here starts imaging using the imaging method determined in step S1208. The first control unit 223 here performs automatic focus control by using the focus drive control unit 204. The first control unit 223 also performs exposure control so that the object has appropriate brightness by using a not-illustrated diaphragm control unit, sensor gain control unit, and shutter control unit. After the imaging, the image processing unit 207 performs various types of conventional image processing, including automatic white balance processing, noise reduction processing, and gamma correction processing, to generate an image. If a predetermined condition is satisfied at the time of imaging, the camera may notify a person to be imaged of the imaging before performing the imaging. The notification method may use, for example, sound from the audio output unit 218 and LED light produced by the LED control unit 224. Examples of the predetermined condition include the number of faces within the angle of view, the degree of smile and the degree of closed eyes of a face, the line of sight angle and the face angle of a human object, a face authentication ID number, and the number of persons personally authenticated and registered. Other examples include a normal object recognition result during imaging, a scene determination result, a time elapsed since the previous imaging, the time of imaging, whether the current position based on GPS information is a scenic spot, a sound level during imaging, and the presence or absence of a speaking person, handclaps, and cheers. Other examples include the vibration information (acceleration information or the foregoing camera state) and the environmental information (temperature, air pressure, illuminance, humidity, and the amount of UV rays). By performing notified imaging based on such conditions, a desirable looking-into-the-camera image can be recorded at an important scene. The notification method and timing of such pre-imaging notification can also be determined by using neural network-based determination on information about the captured image or various types of information detected before imaging. The determination conditions of the determination processing can be changed through the training processing to be described below.

In step S1211, the first control unit 223 performs editing processing, such as processing the image generated in step S1210 and adding the image generated in step S1210 to a moving image. Specific examples of image processing include trimming processing based on a human face or an in-focus position, image rotation processing, a high dynamic range (HDR) effect, a blurring effect, and a color conversion filter effect. A plurality of images subjected to a combination of the foregoing processes may be generated based on the image generated in step S1210, and stored separately from the image generated in the foregoing step S1210. As an example of moving image processing, a captured moving image or still image may be added to a previously-generated moving image to be edited, with special effect processes, such as slide, zoom, and fading. The image processing method in the editing processing of step S1211 can also be determined by using neural network-based determination on the information about the captured image or various types of information detected before imaging. The determination conditions of the determination processing can be changed through the training processing to be described below.

In step S1212, the first control unit 223 performs processing for generating training information about the captured image. Here, the first control unit 223 generates and records information to be used for the training processing to be described below. Specific examples of the information include the zoom magnification during imaging of the currently captured image, a normal object recognition result during imaging, a face detection result, and the number of faces in the captured image. Other examples include the degree of smile and the degree of closed eyes of a face, a face angle, a face authentication ID number, the line of sight angle of a human object, and a scene determination result. Other examples include a time elapsed since the previous imaging, the time of imaging, GPS position information, the amount of change from the previous imaging position, a sound level during imaging, and the presence or absence of a speaking person, handclaps, and cheers. Other examples include the vibration information (acceleration information or the foregoing camera state), the environmental information (temperature, air pressure, illuminance, humidity, and the amount of UV rays), moving image capturing time, and the presence or absence of a manual imaging instruction. The first control unit 223 further calculates a score that is a numerical representation of the output of the neural network about the user's preference in the image.

The first control unit 223 generates such pieces of information and records the information into a captured image file as tag information. The first control unit 223 may write information about captured images into the nonvolatile memory 216 or store the information into the recording medium 221 in a list form as catalog data.

In step S1213, the first control unit 223 updates past imaging information. Specifically, the past imaging information includes the number of images captured in each area described in the description of step S1208, the number of captured images of each person personally authenticated and registered, the number of captured images of each object recognized with normal object recognition, and the number of images captured in each scene determined with scene determination. The first control unit 223 increments the numbers of images to which the currently-captured image applies by one.

<Automatic Editing Mode Processing (Highlight Moving Image)>

Next, the automatic editing mode processing (highlight moving image) according to the present exemplary embodiment will be described. In the mode setting determination of step S704 in FIG. 7, the first control unit 223 determines whether to perform the automatic editing mode processing (highlight moving image). If it is determined that the automatic editing mode processing is to be performed, the first control unit 223 performs the automatic editing mode processing of step S712.

Figure 13:
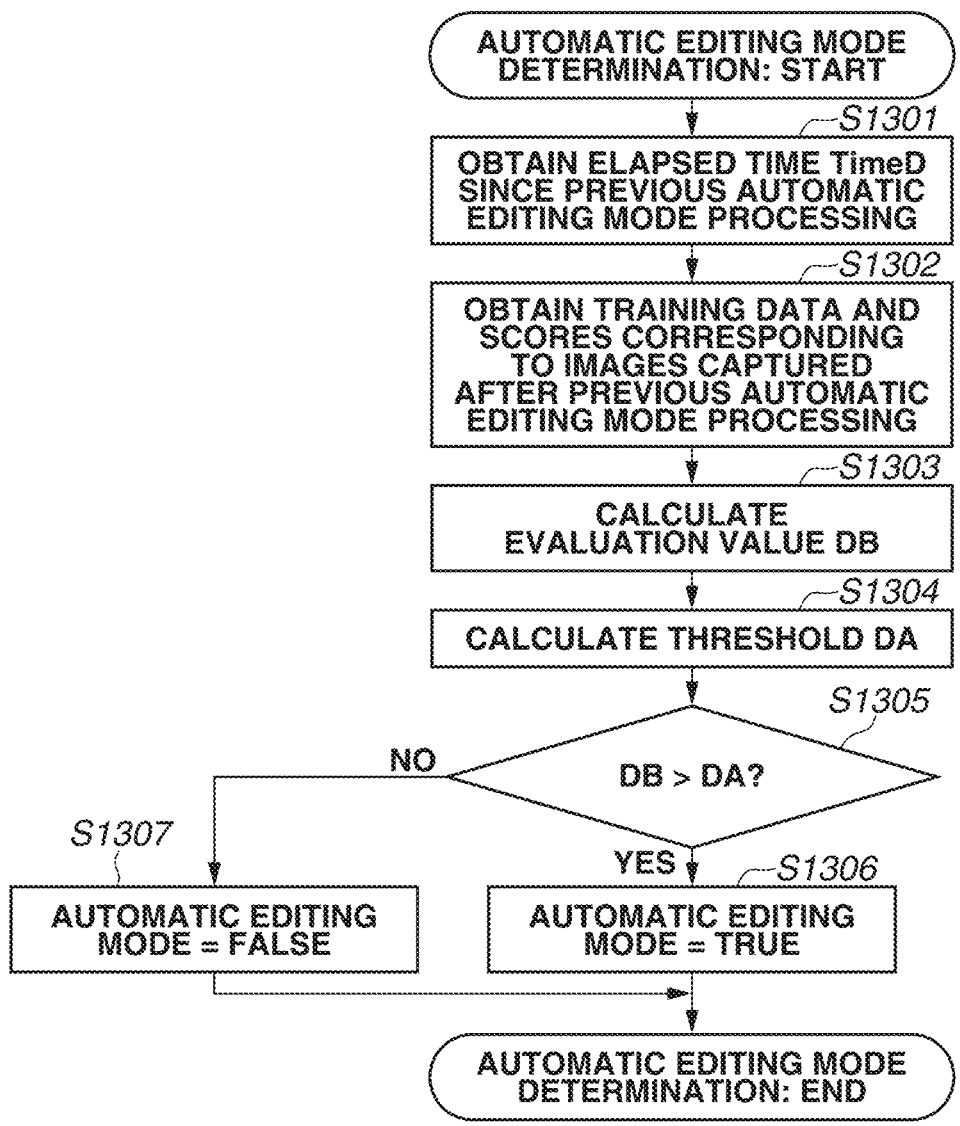
FIG. 13 is a flowchart for illustrating automatic editing mode determination.

Determination conditions for the automatic editing mode will be described. Determination as to whether to enter the automatic editing mode is made based on, for example, a time elapsed since the previous automatic editing mode processing, and training information and scores about images captured after the point in time when the automatic editing mode processing is performed last time. FIG. 13 illustrates a processing flow for determining whether to enter the automatic editing mode, performed in the mode setting determination processing of step S704.

The processing of FIG. 13 is started if an instruction to start automatic editing mode determination is given in the mode setting determination processing of step S704. In step S1301, the first control unit 223 obtains an elapsed time TimeD since the previous automatic editing mode processing. The processing proceeds to step S1302. In step S1302, the first control unit 223 obtains training information and scores corresponding to images captured after the point in time when the automatic editing mode processing is performed last time. The processing proceeds to step S1303. In step S1303, the first control unit 223 calculates an evaluation value DB for determining whether to perform automatic editing from the pieces of data obtained in step S1302. The evaluation value DB is calculated by, for example, extracting image features from each piece of image information and increasing the value of the evaluation value DB as the number of types of features increases. As described in conjunction with the foregoing automatic imaging, scores representing the user's preferences are calculated for the images. The value of the evaluation value DB is also increased as the number of images having high scores increases. The value of the evaluation value DB is also calculated to increase as the number of captured images increases. The evaluation value DB thus depends on the scores, the number of images, and the types of features. The processing proceeds to step S1304. In step S1304, the first control unit 223 calculates a threshold DA from the elapsed time TimeD. For example, a threshold DAa when the elapsed time TimeD is less than a predetermined value is set to be greater than a threshold DAb when the elapsed time TimeD is greater than the predetermined value. The threshold DA is also set to decrease over time. This enables the camera to automatically generate a highlight moving image based on use time by performing the automatic editing mode processing after a lapse of long time even if there is not much imaging data.

After the end of the processing of step S1304, the processing proceeds to step S1305. In step S1305, if the evaluation value DB is greater than the threshold DA (YES in step S1305), the processing proceeds to step S1306. This corresponds to a case where data to be automatically edited is successfully obtained after the point in time when the automatic editing mode processing is performed last time, or where it is determined that the automatic editing mode processing is to be performed due to a lapse of long time. In step S1306, the first control unit 223 sets the automatic editing mode to TRUE. The automatic editing mode determination ends. If, in step S1305, the evaluation value DB is less than or equal to the threshold DA (NO in step S1305), it is determined that data to be automatically edited is not ready and the processing proceeds to step S1307. In step S1307, the first control unit 223 sets the automatic editing mode to FALSE so that the automatic editing processing will not be performed. The automatic editing mode determination ends.

Figure 14:
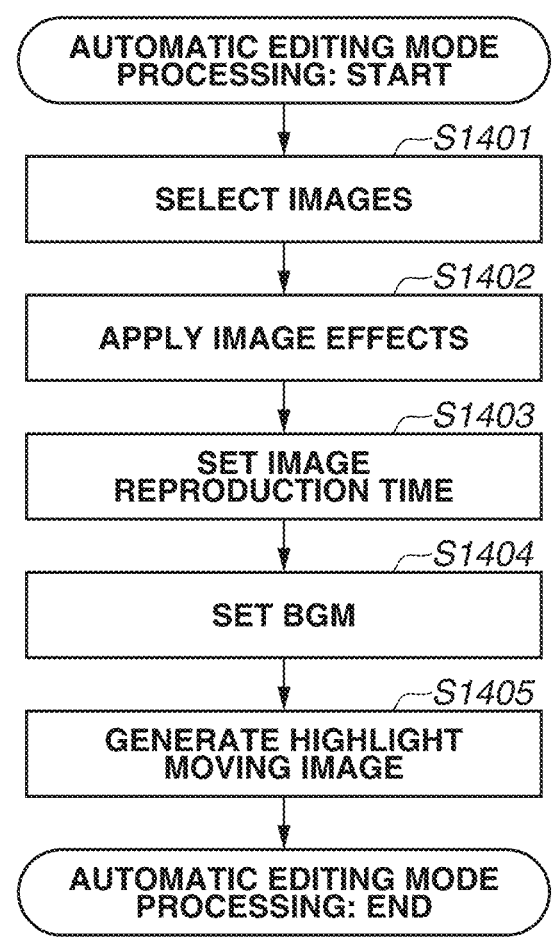
FIG. 14 is a flowchart for illustrating automatic editing mode processing.

Next, processing in the automatic editing mode processing (step S712) will be described. FIG. 14 illustrates a detailed flowchart of the automatic editing mode processing.

In step S1401, the first control unit 223 performs processing (image selection processing) for selecting still images and moving images stored in the recording medium 221, whereby images to be used for editing are selected. The processing proceeds to step S1402.

As employed herein, the image selection processing includes extracting metadata image by image, converting the metadata into evaluation values, and listing images for which the evaluation values reach or exceed a predetermined threshold. Examples of the metadata include the number of faces in the captured still or moving images, face sizes, and color groups. A selection ratio of still and moving images is determined based on a result of training to be described below, so that images are preferentially selected based on the user's settings, imaging frequencies, and various settings.

In step S1402, the first control unit 223 and the image processing unit 207 apply image effects to the images selected in step S1401. The processing proceeds to step S1403.

Examples of the image effects to be applied to a still image include trimming processing with a human face or an in-focus position at the center, image rotation processing, an HDR effect, a blurring effect, special effect processing such as slide, zoom, and fading, and a color filter effect.

A color filter effect is similarly applied to a moving image.

In step S1403, the first control unit 223 sets an image reproduction time. Here, the first control unit 223 sets an appropriate image reproduction time based on a result of training to be described below for the purpose of generating a highlight moving image to be described in step S1405 by using the images selected in step S1401. The processing proceeds to step S1404.

In step S1404, the first control unit 223 sets a piece or pieces of music (background music (BGM)) to be applied to the highlight moving image described in step S1405. Here, the first control unit 223 sets a piece or pieces of music (BGM) the most appropriate to be provided to the user based on a result of training to be described below. The processing proceeds to step S1405.

In step S1405, the first control unit 223 generates a highlight moving image by using the results of processing performed in steps S1401 to S1404. The generated highlight moving image is stored in the recording medium 221.

The images to be selected, the image effects to be applied, the reproduction time, and the BGM described above can be determined from the information attached to the captured images or various types of information detected before imaging based on neural network-based determination. The determination conditions of the determination processing can be changed by the training processing to be described below.

<Training Processing>

Next, training for the user's preferences according to the present exemplary embodiment will be described.

In the present exemplary embodiment, the training processing unit 219 performs training for the user's preferences by using neural networks as illustrated in FIG. 15, and machine learning algorithms A neural network is used to predict an output value from input values. Training a neural network with actual input values and actual output values for the input values in advance enables estimation of an output value for new input values. The training for the user's preferences in the foregoing automatic imaging, automatic editing, and object search is performed by using neural networks.

The training processing unit 219 also registers objects (for face authentication and normal object recognition), and modifies imaging notification control, low power consumption mode control, and automatic file detection by training. The registered objects also serve as feature data to be input to neural networks.

In the present exemplary embodiment, elements to be learned by the training processing include the following:
(1) Automatic imaging,
(2) Automatic editing,
(3) Object search,
(4) Object registration,
(5) Imaging notification control,
(6) Low power consumption mode control,
(7) Automatic file deletion,
(8) Image vibration correction, and
(9) Automatic image transfer.

<Automatic Imaging>

Training for automatic imaging will be described. For automatic imaging, the training processing unit 219 performs training so that an image in line with the user's preferences is automatically captured. As described above with reference to the flowchart of FIG. 12, the training information generation processing is performed after imaging (in step S1212). The training processing unit 219 automatically selects images to be learned i.e., images that are likely to be preferred by the user, with a method to be described below, and trains neural networks by changing weights based on the training information included in the selected images.

The training processing unit 219 performs the training by modifying a neural network for determining the automatic imaging timing and by modifying a neural network for determining the imaging method (still image capturing, moving image capturing, continuous shooting, or panoramic imaging).

<Automatic Editing>

Training for automatic editing will be described. For automatic editing, the training processing unit 219 performs training for both the editing immediately after imaging in step S1211 of FIG. 12 and the editing of a highlight moving image described in FIG. 13.

The editing immediately after imaging will be described. The training processing unit 219 automatically selects images to be learned i.e., images that are likely to be preferred by the user, with a method to be described below, and trains a neural network by changing weights based on the training information included in the selected images. The training processing unit 219 inputs various types of detection information obtained from information during or immediately before imaging into the neural network, and determines an editing method (such as trimming processing, image rotation processing, an HDR effect, a blurring effect, and a color conversion filter effect).

The editing of a highlight moving image will be described. The training processing unit 219 performs training for a highlight moving image so that a highlight moving image in line with the user's preferences is automatically created. The training processing unit 219 automatically select images to be learned, i.e., images that are likely to be preferred by the user, with a method to be described below, and trains a neural network by changing weights based on training information included in the images. The training processing unit 219 inputs various types of detection information obtained from information during or immediately before imaging into the neural network, and determines an image effect to be applied (trimming processing, rotation processing, an HDR effect, a blurring effect, slide, zoom, fading, a color conversion filer effect, BGM, time, and the ratio of still and moving images).

<Object Search>

Training for an object search will be described. The training processing unit 219 performs training for an object search so that an object in line with the user's preferences is automatically searched. As described above with reference to the flowchart in FIG. 12, in the object search processing (step S1204), the first control unit 223 calculates the importance levels of the respective areas and performs pan, tilt, and zoom driving to search for an object. The training processing unit 219 trains a neural network with captured images and detection information during a search by changing weights.

The first control unit 223 performs an object search on which the training is reflected by inputting various types of detection information during a search operation into the neural network to determine an importance level. Aside from the calculation of the importance level, the first control unit 223 also determines a pan and tilt search method (speed and moving frequency), for example.

<Object Registration>

Training for object registration will be described. The training processing unit 219 performs training for object registration so that objects are automatically registered and ranked in line with the user's preferences. For training, the training processing unit 219 performs, for example, face authentication registration, normal object recognition registration, gesture and voice recognition, and sound-based scene recognition registration. The training processing unit 219 performs authentication registration on persons and normal objects. The training processing unit 219 sets ranks based on the number of times or frequency of image acquisition, the number of times or frequency of manual imaging, and the frequency of appearance of searched objects. Such pieces of information are registered as inputs for neural network-based determinations.

<Imaging Notification Control>

Training for imaging notification control will be described. As described in step S1210 of FIG. 12, if a predetermined condition is satisfied immediately before imaging, the camera notifies the person to be imaged of the imaging before performing the imaging. For example, the camera uses a pan/tilt-driven motion visually guiding the line of sight of the object, a speaker sound issued from the audio output unit 218, and/or LED light produced by the LED control unit 224.

The training processing unit 219 determines whether to use the detection information for training based on whether detection information on the object (such as the degree of smile, the direction of eyes, and gesture) is obtained immediately after the notification. The training processing unit 219 trains the neural networks by changing weights.

The first control unit 223 inputs pieces of detection information immediately before imaging into the neural networks to determine whether to perform notification and to determine operations (sound (sound level/sound type/timing), light (lighting time, speed), and pan/tilt motion).

<Low Power Consumption Mode Control>

The power supply to the main processor (first control unit 223) is controlled on/off as described with reference to FIGS. 7 and 8. The training processing unit 219 performs training for conditions to recover from the low power consumption mode and conditions to enter the low power consumption mode.

Training for conditions to cancel the low power consumption mode will be described.

(1) Tap Detection

As described above, the predetermined time TimeA and the predetermined threshold ThreshA are changed by training. Provisional tap detection is performed with the foregoing threshold ThreshA for tap detection lowered. Depending on whether a provisional tap is determined to have been detected before tap detection, the parameters TimeA and ThreshA are set to facilitate detection.

If it is determined that a tap is not an activation cause based on camera detection information after tap detection, the parameters TimeA and ThreshA are set to make detection difficult.

(2) Vibration State Detection

As described above, the predetermined time TimeB, the predetermined threshold ThreshB, and the predetermined number of times CountB are changed by training. If the vibration state satisfies an activation condition, the first control unit 223 is activated. If it is determined that the vibration state is not an activation cause based on the camera detection information over a predetermined time after the activation, the neural network is trained to make activation based on vibration state determination difficult. If the imaging frequency under large vibrations is determined to be high, the neural network is set to make activation based on vibration state determination easy.

(3) Sound Detection

Training can be performed by the user manually setting a specific voice, a specific sound scene to be detected, or a specific sound level, for example, via communication with the dedicated application of the external device 301.

Training can also be performed by using the following method. Set a plurality of sounds to be detected in the audio processing unit 214 in advance. Automatically select images to be learned (images that are likely to be preferred by the user) by using a method to be descried below. Train a neural network with sound information before and after imaging, included in the selected images. Set a sound (specific sound command or sound scene such as "cheers" and "handclaps") as an activation cause.

(4) Image Difference Detection

As described above, if an image difference between the peripheral image A in entering the low power consumption mode and the peripheral image B captured during cancellation determination is large, the second control unit 211 determines that the imaging scene has changed, and cancels the low power consumption mode. The threshold for the image difference and the position of the object at which the image difference is to be obtained are changed through training. For example, if it is determined that the image difference is large and the low power consumption mode is cancelled, but no image worth automatic imaging is then captured, the threshold for the image difference is set to increase so that the low power consumption mode is less likely to be exited. If it is determined that the duration in which the low power consumption mode is cancelled is long and the power consumption too high, the threshold for the image difference is set to increase so that the low power consumption mode is less likely to be exited.

(5) Environmental Information Detection

Training can be performed by the user manually setting conditions about a change in environmental information for activation, for example, via communication with the dedicated application of the external device 301. For example, the first control unit 223 can be activated based on specific conditions on temperature, air pressure, brightness, humidity, and/or the absolute amount of or a change in the amount of UV rays.

The training processing unit 219 can train the neural network with determination thresholds based on respective pieces of environmental information. If it is determined that environmental information is not an activation cause based on camera detection information after activation due to the environmental information, determination threshold parameters are set to make detection difficult.

The foregoing parameters also change with the remaining battery level. For example, if the remaining battery level is low, the parameters are less likely to be taken into account in making various determinations. If the remaining battery level is high, the parameters are more likely to be taken into account in making various determinations. Specifically, the detection result of the vibration state and the detection result of a sound scene by sound detection are conditions not constituting the causes for which the user definitely wants to activate the camera. The likelihood of such conditions being taken into detection determination changes with the remaining battery level.

The conditions to cancel the low power consumption mode can also be determined by neural network-based determination on information about vibration detection, sound detection, and time lapse detection, various types of environmental information, and the remaining battery level. In such a case, the training processing unit 219 automatically selects images to be learned by using a method to be described below, and trains the neural network by changing weights based on training information included in the selected images.

Training for conditions to enter the low power consumption mode will be described. As illustrated in FIG. 7, if, in the mode setting determination of step S704, it is determined that the mode setting is none of the "automatic imaging mode", "automatic editing mode", "automatic image transfer mode", "training mode", and "automatic file deletion mode", the imaging apparatus 101 enters the low power consumption mode. The determination conditions of the respective modes are described above. The determination conditions of the respective modes are also changed by training.

(1) Automatic Imaging Mode

As described above, the first control unit 223 determines the importance levels of the respective areas and performs an object search with pan and tilt driving for automatic imaging. If the first control unit 223 determines that there is no object to be imaged, the first control unit 223 cancels the automatic imaging mode. For example, if the importance levels of all the areas or the total value of the importance levels of the areas fall(s) to or below a predetermined threshold, the first control unit 223 cancels the automatic imaging mode. Here, the first control unit 223 decreases the predetermined threshold based on a time elapsed since the transition to the automatic imaging mode. The greater the time elapsed since the transition to the automatic imaging mode, the easier to enter the low power consumption mode.

Low power consumption mode control based on battery life can be performed by the predetermined threshold being changed based on the remaining battery level. For example, the lower the remaining battery level, the higher the threshold. The higher the remaining battery level, the lower the threshold. The first control unit 223 sets the parameter (elapsed time threshold TimeC) of the condition to cancel the low power consumption mode next time into the sub processor based on the elapsed time and the number of images captured since the previous transition to the automatic imaging mode.

The foregoing thresholds are changed by training.

Training can be performed by manually setting the imaging frequency and the activation frequency, for example, via communication with the dedicated application of the external device 301.

The training processing unit 219 may be configured to accumulate an average value or time-slot-by-time-slot distribution data of elapsed time from the turning on to the turning off of the power button of the imaging apparatus 101, and train neural networks with the parameters. In such a case, the neural networks are trained to reduce the time intervals to recover from the low power consumption mode and enter the low power consumption mode if the user powers on and off the imaging apparatus 101 at short cycles. If the user powers on and off the imaging apparatus 101 at long cycles, the neural networks are trained to increase the intervals.

The neural networks are also trained with detection information during search. If it is determined that objects set to be important through training is large in number, the neural networks are trained to decrease the time intervals to recover from the low power consumption mode and enter the low power consumption mode. If important objects are small in number, the neural networks are trained to increase the intervals.

<Automatic File Deletion>

Training for automatic file deletion will be described. The training processing unit 219 performs training for automatic file deletion in terms of free file space and selection of images to be deleted with higher priority. By using a method to be described below, the user selects images to be deleted based on the capturing dates and times of images obtained by the external device 301 and the edit contents of the obtained moving image generated by the automatic editing (highlight moving image). The training processing unit 219 then trains a neural network with the selected images to be deleted. For example, if the obtained highlight moving image includes a lot of images captured in short time intervals, the neural network is trained to delete files captured at earlier dates and times with higher priority. If the highlight moving image includes images captured at long time intervals, the neural network is trained not to delete files of high scores even if the dates and times are earlier.

In another example, if the neural network is trained to increase the imaging frequency, files are automatically deleted to increase the free file space. If the neural network is trained to decrease the imaging frequency, files are automatically deleted to leave less free file space.

In another example, if the neural network is trained to increase the frequency of moving image capturing, files are automatically deleted to increase the free file space. If the neural network is trained to increase the frequency of still image capturing, files are automatically deleted to leave less free file space.

<Image Vibration Correction>

Training for image vibration correction will be described. Image vibration correction is performed by calculating correction amounts in step S1202 of FIG. 12, and driving the tilt rotation unit 104 and the pan rotation unit 105 based on the correction amounts in step S1205. The training processing unit 219 performs training for image vibration correction so that corrections are made based on the user's vibration characteristics.

The direction and magnitude of a camera shake in a captured image can be estimated, for example, by a point spread function (PSF) being estimated. In the training information generation processing of step S1212 in FIG. 12, the estimated direction and magnitude of the camera shake are added to the image as information.

In the training mode processing of step S716 in FIG. 7, the training processing unit 219 trains a neural network for vibration correction with pieces of detection information during imaging (motion vector information about the image within a predetermined time before imaging), with the estimated direction and magnitude of the camera shake as an output. The training processing unit 219 also trains the neural network for vibration correction by changing weights with motion information about the detected object (person or normal object) and the vibration information (gyro output, acceleration output, and the foregoing camera state) as inputs. The determination inputs may also include the environmental information (temperature, air pressure, illuminance, and humidity), sound information (sound scene determination, specific voice detection, and a change in sound level), time information (elapsed time since activation and elapsed time since the previous imaging), and location information (GPS position information and the amount of change in position and movement).

In calculating the image vibration correction amounts in step S1202, the magnitude of the camera shake at the moment of imaging can be estimated by the foregoing pieces of detection information being input into the neural network. If the estimated magnitude of the camera shake is large, the first control unit 223 can perform control to increase the shutter speed. If the estimated magnitude of the camera shake is large, imaging may be disabled to avoid a blurred image.

Since the pan and tilt driving angles are limited, a further correction becomes unavailable once the driving ends are reached. However, the needed range of pan and tilt driving for making a vibration correction during exposure can be estimated by the magnitude and direction of a camera shake during imaging being estimated. If the movable range has not much margin during exposure, a large camera shake can be suppressed by increasing the cutoff frequency of the filter for calculating the image vibration correction amounts so that the movable range is not exceeded. If the movable range is likely to be exceeded, imaging without a camera shake can be performed by the pan and tilt angles being rotated in directions opposite to those in which the movable range is likely to be exceeded immediately before exposure, and then exposure being started with a sufficient movable range.

In such a manner, the neural network can be trained for vibration correction according to the user's characteristics and usages during imaging. Captured images can thus be prevented from being blurred.

In the foregoing determination of the imaging method, the first control unit 223 may determine whether to perform panning to capture an image such that a moving object appears without a blur and a stationary background appears to pass by, and perform object blur correction based on detection information before imaging. The first control unit 223 estimates the pan and tilt driving speeds for capturing the object without a blur from the detection information before imaging, and performs the object blur correction. In such a case, the driving speeds are estimated by the foregoing pieces of detection information being input into a pre-trained neural network.

To train the neural network, the first control unit 223 divides an image into blocks and estimates PSF in each block to estimate the direction and magnitude of a blur in the blocks where the main object is included. Based on the information, the training processing unit 219 can train the neural network.

The amount of background panning may be learned from information about images selected by the user. In such a case, the first control unit 223 estimates the magnitude of a blur in the blocks where the main object is not included. The user's preferences can be learned based on the information. The first control unit 223 can set the shutter speed during imaging based on the learned preferred amount of background panning, whereby an image with a panning effect in line with the user's preferences can be automatically captured.

<Automatic Image Transfer>

Training for automatic image transfer will be described. For automatic image transfer, the training processing unit 219 performs training about selection of images to be transferred with higher priority among the images recorded on the recording medium 221 and about transfer frequency. The training processing unit 219 automatically selects images to be learned (images that are likely to be preferred by the user) by using a method to be described below. The training processing unit 219 can train neural networks by changing weights based on training information included in the selected images. As described above in conjunction with the automatic imaging, scores representing the user's preferences are calculated for the respective images. Images of higher scores are transferred with higher priority.

Training information corresponding to images transferred in the past is also used for image transfer determination and is also changed by training. Suppose that the user selects images to be learned by using the method to be described below, and sets which piece of training information (feature amount) included in the images to place importance on. If many of images transferred in the past include similar feature amounts, the training processing unit 219 makes settings so that images including other feature amounts and having high scores are transferred.

The image transfer frequency also changes depending on various states of the camera.

The image transfer frequency changes with the remaining battery level. For example, the lower the remaining battery level, the less frequently images are set to be transferred. The higher the remaining battery level, the more frequently images are set to be transferred. Specifically, for example, such a change in the image transfer frequency can be implemented by configuring the neural network to multiply the time elapsed since the previous automatic transfer by the highest of the scores of images captured within the elapsed time, and transfer images if the product exceeds a threshold. The threshold is then changed based on the remaining battery level.

In another example, the imaging apparatus 101 changes the frequency of automatic image transfer based on a set imaging frequency. If the neural network is trained to increase the imaging frequency, the frequency of automatic image transfer is also set to increase. If the neural network is trained to decrease the imaging frequency, the frequency of automatic image transfer is also set to decrease. The image transfer frequency based on the setting of the imaging frequency can be changed by the foregoing threshold being changed depending on the imaging frequency.

In another example, the frequency of automatic image transfer is changed based on the file free space (on the recording medium 221). The larger the file free space, the lower the frequency of automatic image transfer is set to be. The smaller the file free space, the higher the frequency of automatic image transfer is set to be. The image transfer frequency based on the file free space can be changed by the foregoing threshold being changed depending on the file free space.

Next, training methods will be described. Possible training methods include ones for "training within the camera" and ones for "training in cooperation with a communication device".

Methods for in-camera training will be described. The methods for in-camera training according to the present exemplary embodiment include the following:
(1) Training with detection information during manual imaging, and
(2) Training with detection information during an object search.

<Training with Detection Information During Manual Imaging>

Figure 12:
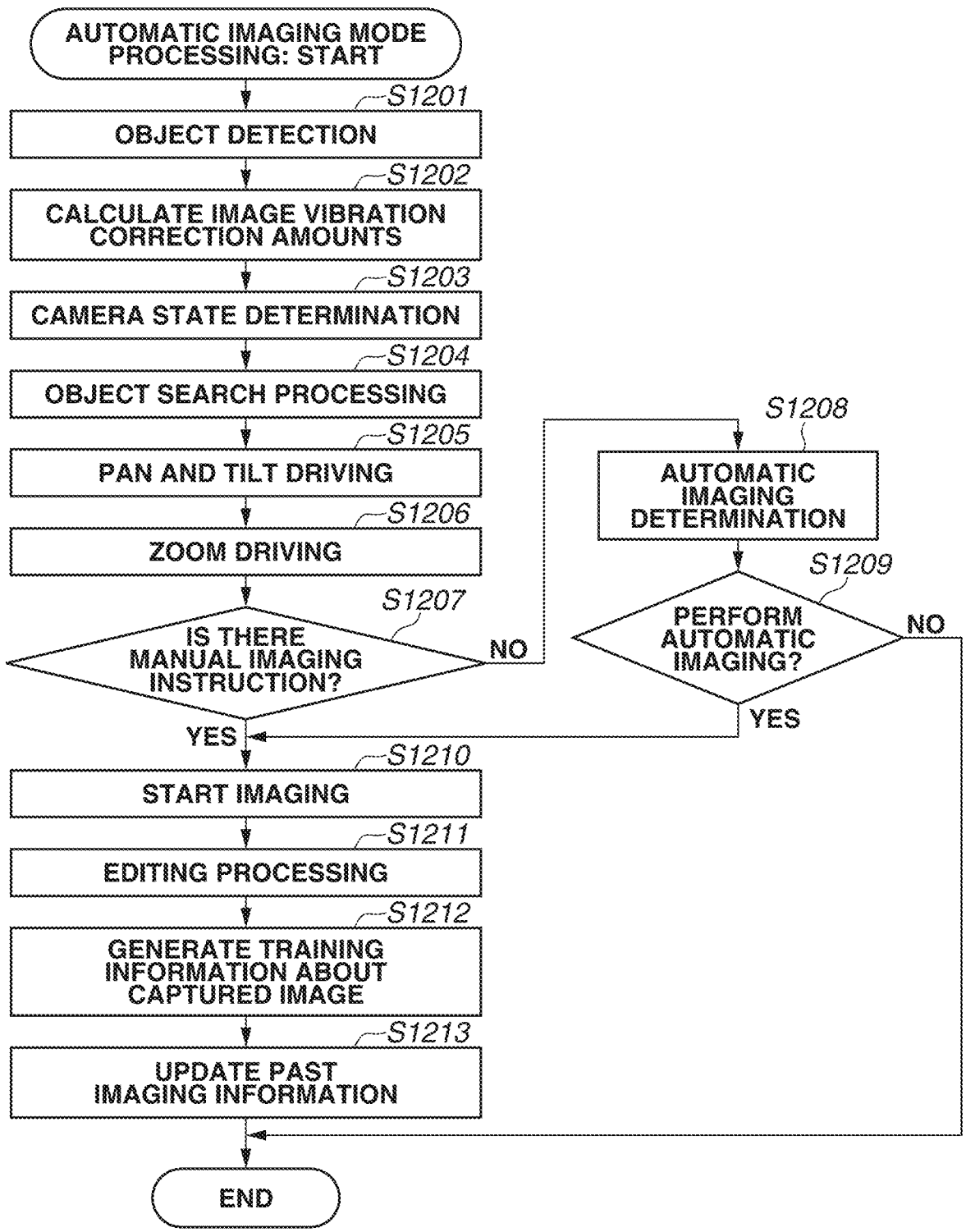
FIG. 12 is a flowchart for illustrating imaging mode processing.

As described in steps S1207 to S1213 of FIG. 12, in the present exemplary embodiment, the imaging apparatus 101 can perform two types of imaging, namely, manual imaging and automatic imaging. If, in step S1207, there is a manual imaging instruction (as described above, three determinations are included), then in step S1212, information indicating that the image is a manually captured one is attached to the captured image. If, in step S1209, it is determined that automatic imaging is to be performed, then in step S1212, information indicating that the image is an automatically captured one is attached to the captured image.

In the case of manual imaging, the captured image is highly likely to be one captured based on an object, scene, location, and/or time intervals preferred by the user. The training processing unit 219 then performs training based on pieces of feature data obtained during manual imaging and training information about the captured image.

The training processing unit 219 also performs training concerning extraction of feature amounts in the captured image, registration of personal authentication, registration of each person's expression, and registration of a combination of persons based on the detection information during manual imaging. The training processing unit 219 further performs training to change the importance of persons and normal objects nearby based on detection information during an object search, for example, based on the expression of a personally authenticated and registered object.

<Training with Detection Information During Object Search>

During an object search operation, the first control unit 223 determines what persons, normal objects, and scenes a personally authenticated and registered object is captured with, and calculates time ratios by which the personally authenticated and registered object is simultaneously captured with the persons, normal objects, and scenes within the same angle of view.

For example, the first control unit 223 calculates a time ratio by which person A who is a personally authenticated and registered object is captured with person B who is a personally authenticated and registered object. The first control unit 223 then stores various types of detection information as training data so that a score for the automatic imaging determination increases if persons A and B fall within the angle of view. The training processing unit 219 then performs training in the training mode processing of step S716.

In another example, the first control unit 223 calculates a time ratio by which person A who is a personally authenticated and registered object is captured with an object "cat" determined by normal object recognition. The first control unit 223 then stores various types of detection information as training data so that a score for automatic imaging determination increases if person A and a "cat" fall within the angle of view. The training processing unit 219 then performs training in the training mode processing of step S716.

In yet another example, if "happiness" or "amazement" is detected through detection of the degree of smile or expression of person A who is a personally authenticated and registered object. In such a case, the training processing unit 219 trains the neural networks so that objects captured with person A have high importance. If expressions such as "anger" and "straight face" are detected, the training processing unit 219 performs processing not to perform training because objects captured with person A are less likely to be important.

Next, training in cooperation with an external communication device according to the present exemplary embodiment will be described. The methods for training in cooperation with an external communication device according to the present exemplary embodiment include the following:

(1) Training based on acquisition of images by the external communication device,
(2) Training based on input of determination values for images via the external communication device,
(3) Training based on analysis of images stored in the external communication device,
(4) Training based on information uploaded to a social networking service (SNS) server by the external communication device,
(5) Training based on a change of camera parameters by the external communication device, and
(6) Training based on information about manual editing of an image by the external communication device.

<Training Based on Acquisition of Image by External Communication Device>

As described in FIG. 3, the imaging apparatus 101 and the external device 301 include communication units for the communications 302 and 303. Images are transmitted and received mostly by the communication 302. The external device 301 can obtain images in the imaging apparatus 101 through communication via the dedicated application in the external device 301. Thumbnail images of image data stored in the imaging apparatus 101 can be browsed via the dedicated application in the external device 301. With such a configuration, the user can select his/her favorite images from the thumbnail images, check the images, and issue an image acquisition instruction to acquire the images into the external device 301.

Since the images are selected and acquired by the user, the acquired images are highly likely to be ones preferred by the user. Thus, it is determined that the acquired images are ones to be learned, and training is performed based on training information about acquired images. In this way, various types of training for the user's preferences can be performed.

Operation examples will be described.

Figure 19:
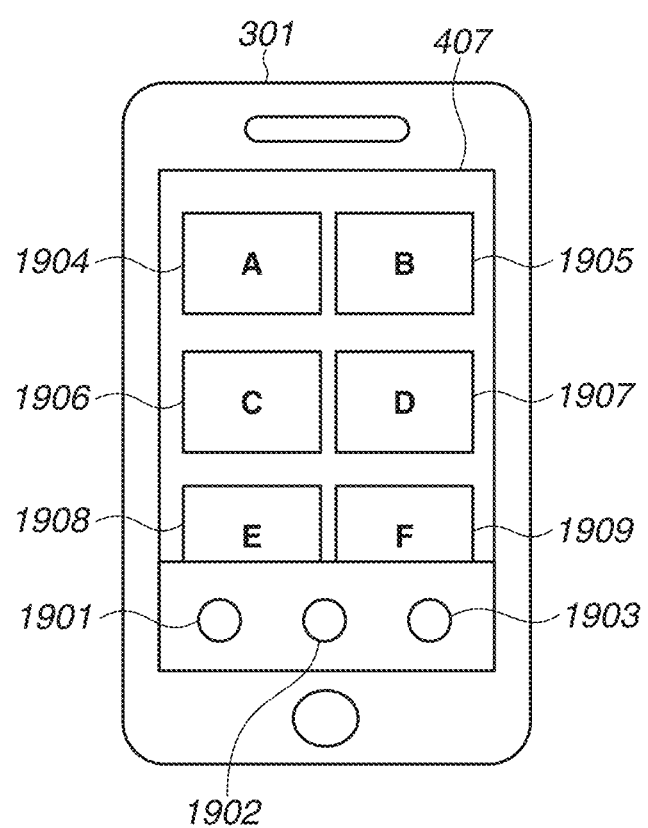
FIG. 19 is a diagram for illustrating display processing.

FIG. 19 illustrates a display example in a case where the user is browsing images in the imaging apparatus 101 via the dedicated application in the external device 301 that is a smart device. Thumbnail images 1904 to 1909 of image data stored in the camera are displayed on the display unit 407, and the user can select and acquire his/her favorite images. There are provided display method change parts 1901, 1902, and 1903 for changing a display method. If the display method change part 1901 is pressed, the display method is changed to a date and time priority display mode, in which the thumbnail images are displayed on the display unit 407 in order of the capturing date and time of the images in the imaging apparatus 101. For example, the thumbnail image 1904 is displayed with a later date and time, and the thumbnail image 1909 with an earlier date and time. If the display method change part 1902 is pressed, the display method is changed to a recommended image priority display mode. The thumbnail images are displayed on the display unit 407 in descending order of the scores of the images in the imaging apparatus 101 based on the scores determined from the user's preferences in the images, calculated in step S1212 of FIG. 12. For example, the thumbnail image 1904 is displayed with a higher score, and the thumbnail image 1909 with a lower score. If the display method change part 1903 is pressed, the user can specify a person or normal object. Then, if a specific person or normal object is specified, only the thumbnail images of images including the specific object can be displayed.

The display method change parts 1901 to 1903 can be simultaneously set on. For example, if all the display method change parts 1901 to 1903 are set on, only the thumbnail images of images including a specified object are displayed with priority given to ones with later dates and times and with priority given to ones of higher scores.

Since the user's preferences in the captured images are learned, only the images preferred by the user can thus be easily extracted from a large amount of captured images with simple check operations.

<Training by Input of Determination Values for Images Via External Communication Device>

As described above, the imaging apparatus 101 and the external device 301 include the communication units, and are configured so that the images stored in the imaging apparatus 101 can be browsed via the dedicated application in the external device 301. The imaging apparatus 101 and the external device 301 may be configured so that the user assigns scores to the images. The imaging apparatus 101 and the external device 301 are configured so that the user can assign a high score (for example, five points) to his/her favorite images and assign a low score (for example, one point) to images that are not, and the camera learns the scores based on the user operations. The scores of the images are used for re-training in the camera, along with training information. A neural network is trained to provide an output closer to a score specified by the user, where feature data extracted from specified image information is input.

In the present exemplary embodiment, the external device 301 is configured so that the user inputs determination values for captured images via the external device 301. Alternatively, the imaging apparatus 101 may be configured so that the user operates the imaging apparatus 101 to directly input determination values for images. In such a case, for example, the imaging apparatus 101 includes a touch panel display, and the user presses a graphical user interface (GUI) button displayed on a screen display unit of the touch panel display to set a mode for displaying captured images. Similar training can be performed by the user checking the captured images and inputting determination values for the respective images.

<Training by Analyzing Images Stored in External Communication Device>

The external device 301 includes the storage unit 404. The storage unit 404 is configured to record images other than those captured by the imaging apparatus 101 as well. Since the images stored in the external device 301 can be easily browsed by the user and can be easily uploaded to a shared server via the public line control unit 406, the images are highly likely to include a lot of images preferred by the user.

The external device 301 is configured so that the control unit 411 can perform training processing similar to that of the training processing unit 219 in the imaging apparatus 101 on the images stored in the storage unit 404 via the dedicated application. The external device 301 may be configured to communicate the processed training data to the imaging apparatus 101 for training. The external device 301 may be configured to transmit images or data to be learned to the imaging apparatus 101 so that the imaging apparatus 101 performs training inside.

The external device 301 can be configured so that the user selects images to be learned from the images stored in the storage unit 404 via the dedicated application, and training is performed.

Training Based on Information Uploaded to SNS Server by External Communication Device>

A method for using information on an SNS for training will be described. An SNS is a service or website by which a social network can be constructed with emphasis on connections between people. There is a technique for inputting a tag related to an image from a smart device and transmitting the tag with the image in uploading the image to an SNS. There is also a technique for inputting a like or dislike for an image uploaded by another user. Whether an image uploaded by another user is a photo preferred by the user owning the external devices 301 can be determined.

A dedicated SNS application downloaded to the external device 301 can obtain images uploaded by the user himself/ herself as described above and information about the images. If the user inputs whether he/she likes images uploaded by other users, the SNS application can also obtain images and tag information preferred by the user. The SNS application is configured to be able to analyze such images and tag information and set the resultant into the imaging apparatus 101 for training.

The external device 301 is configured so that the control unit 411 can obtain the images uploaded by the user as described above and the images the user determines that he/she likes, and perform training processing similar to that of the training processing unit 219 in the imaging apparatus 101. The external device 301 can be configured to communicate the processed training data to the imaging apparatus 101 for training. The external device 301 may be configured to transmit images to be learned to the imaging apparatus 101 so that the imaging apparatus 101 performs training inside.

The external device 301 performs training to change the color conversion filter effects in the automatic editing mode processing of step S712 in FIG. 7 and the editing processing of step S1211 in FIG. 12 based on the tag information and image filters provided by the SNS.

The imaging apparatus 101 may estimate objects likely to be preferred by the user from object information (for example, normal object information, such as a dog and a cat, scene information, such as a beach, and expression information, such as a smile) set in the tag information. The external device 301 then performs training with registration of the estimated objects as ones to be detected, to be input to a neural network.

The external device 301 can be configured to be able to estimate image information prevalent in the world at present from statistics of the SNS tag information (image filter information and object information) and set the estimated image information into the imaging apparatus 101 for training.

<Training Based on Change of Camera Parameters with External Communication Device>

As described above, the imaging apparatus 101 and the external device 301 include the communication units. Training parameters (such as the weights of the neural networks and the selection of objects input to the neural networks) currently set in the imaging apparatus 101 can be communicated to the external device 301 and stored in the storage unit 404 of the external device 301. The imaging apparatus 101 and the external device 301 are configured so that the dedicated application in the external device 301 can obtain training parameters set in a dedicated server via the public line control unit 406 and set the obtained training parameters as the training parameters in the imaging apparatus 101. Training parameters at a point in time can thereby be stored in the external device 301 and then set into the imaging apparatus 101 for restoration. Training parameters of other users can be obtained via the dedicated server and set into the own imaging apparatus 101.

The external device 301 may be configured so that the user can register voice commands, authentication information, and/or gestures via the dedicated application of the external device 301. Important locations may also be registered. Such information is handled as input data for the case described in conjunction with the automatic imaging mode processing (FIG. 12) where imaging is triggered by the automatic imaging determination.

The external device 301 may be configured to be able to set the imaging frequency, activation intervals, the ratio of still and moving images, and favorite images, whereby the activation intervals described in the <Low Power Consumption Mode Control> section and the ratio of still and moving images described in the <Automatic Editing> section may be set.

<Training Based on Information about Manual Editing of Image with External Communication Device>

The dedicated application of the external device 301 may have a function capable of manual editing based on the user's operations, and the content of the edit operations may be fed back to the training.

For example, editing of applying image effects (trimming processing, rotation processing, slide, zoom, fading, a color conversion filter effect, time, the ratio of still and moving images, and BGM) can be performed. Neural networks for automatic editing are trained to determine application of the manually-edited image effects based on training information about the image.

Next, a training processing sequence will be described.

In the mode setting determination in step S704 of FIG. 7, the first control unit 223 determines whether to perform training processing. If it is determined that the training processing is to be performed, it is determined that the mode setting is the training mode. In step S716, the first control unit 223 performs the training mode processing.

Figure 17:
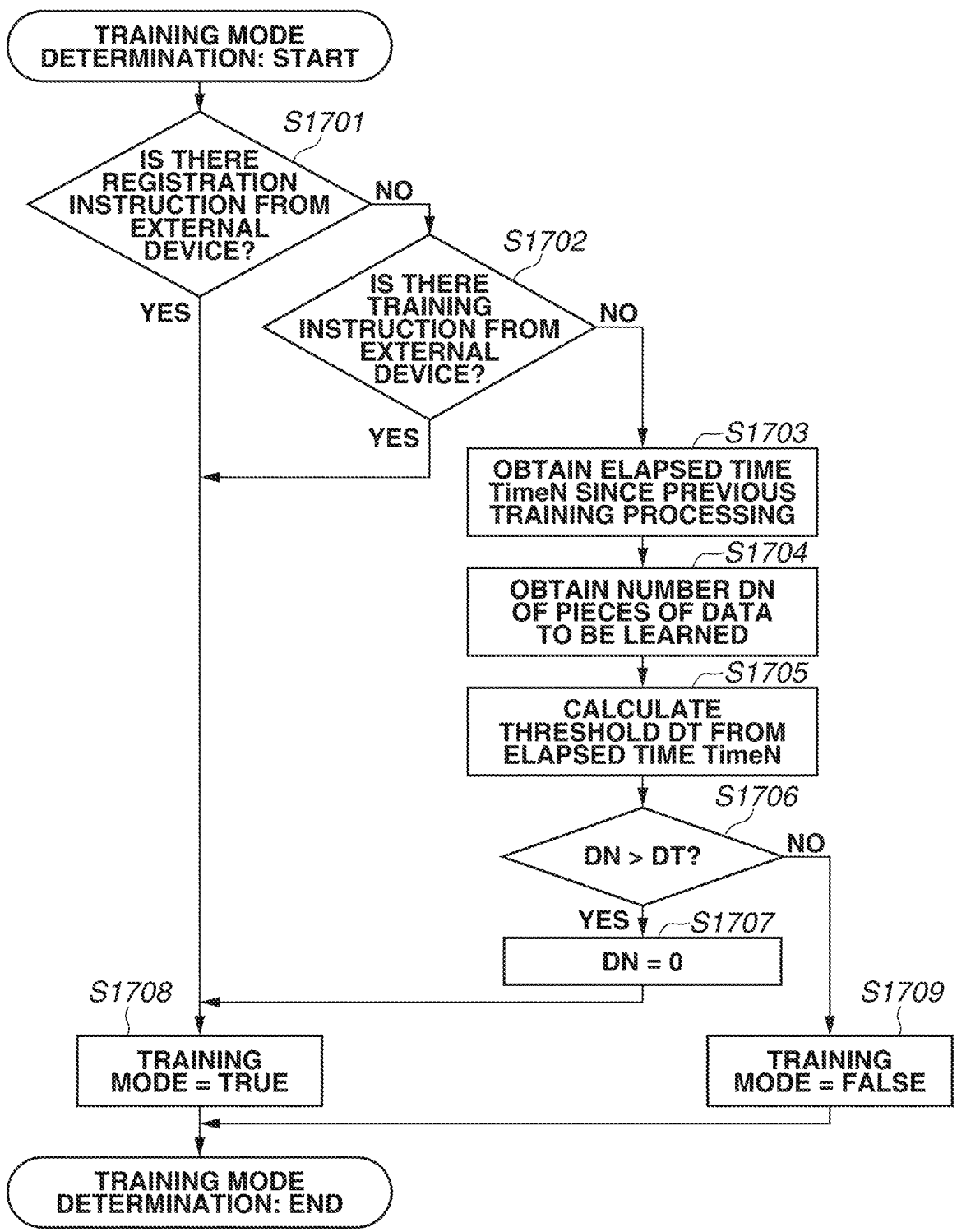
FIG. 17 is a flowchart for illustrating training mode determination.

The determination conditions for the training mode will be described. Whether or not to enter the training mode is determined from the time elapsed since the previous training processing, the number of pieces of information available for training, and whether a training processing instruction has been given via the external device 301. FIG. 17 illustrates a determination processing flow for determining whether to enter the training mode in the mode setting determination processing of step S704.

The processing of FIG. 17 starts when an instruction to start training mode determination is given in the mode setting determination processing of step S704. In step S1701, the first control unit 223 determines whether there is a registration instruction from the external device 301. The first control unit 223 here determines whether there is a registration instruction for performing training, such as the foregoing <training based on acquisition of images with the communication device> and <training based on input of determination values for images via the communication device>. The first control unit 223 also determines whether there is a registration instruction for performing training such as the <training based on analysis of images stored in the communication device>. In step S1701, if there is a registration instruction from the external device 301 (YES in step S1701), the processing proceeds to step S1708. In step S1708, the first control unit 223 sets the training mode to TRUE, and makes settings to perform the processing of step S716. If, in step S1701, there is no registration instruction from the external device 301 (NO in step S1701), the processing proceeds to step S1702. In step S1702, the first control unit 223 determines whether there is a training instruction from the external device 301. The first control unit 223 here determines whether a training instruction to set training parameters is given, as with the <training based on a change of camera parameters with the external communication device>. In step S1702, if there is a training instruction from the external device 301 (YES in step S1702), the processing proceeds to step S1708. In step S1708, the first control unit 223 sets the training mode to TRUE, and makes settings to perform the processing of step S716. The training mode determination processing ends. If, in step S1702, there is no training instruction from the external device 301 (NO in step S1702), the processing proceeds to step S1703.

In step S1703, the first control unit 223 obtains an elapsed time TimeN since the previous training processing (recalculation of neural network weights). The processing proceeds to step S1704. In step S1704, the first control unit 223 obtains the number DN of new pieces of data to be learned (the number of images specified to be learned during the elapsed time TimeN since the previous training processing). The processing proceeds to step S1705. In step S1705, the first control unit 223 calculates a threshold DT from the elapsed time TimeN. For example, a threshold DTa when the elapsed time TimeN is less than a predetermined value is set to be greater than a threshold DTb when the elapsed time TimeN is greater than the predetermined value. The threshold DT is also set to decrease over time. Thus, training is performed again after a lapse of long time even if there is not much training data, facilitating the camera being trained and changed based on use time.

After the calculation of the threshold DT in step S1705, the processing proceeds to step S1706. In step S1706, the first control unit 223 determines whether the number DN of pieces of data to be learned is greater than the threshold DT. If the number DN of pieces of data is greater than the threshold DT (YES in step S1706), the processing proceeds to step S1707. In step S1707, the first control unit 223 sets the number DN of pieces of data to 0. The processing proceeds to step S1708. In step S1708, the first control unit 223 sets the training mode to TRUE and makes settings to perform the processing of step S716. The training mode determination processing ends.

In step S1706, if the number DN of pieces of data is less than or equal to the threshold DT (NO in step S1706), the processing proceeds to step S1709. In step S1709, the first control unit 223 sets the training mode to FALSE and makes settings not to perform the processing of step S716 since there is no registration instruction from the external device 301, there is no training instruction from the external device 301, and the number DN of pieces of training data is less than or equal to the predetermined value. The training mode determination processing ends.

Figure 18:
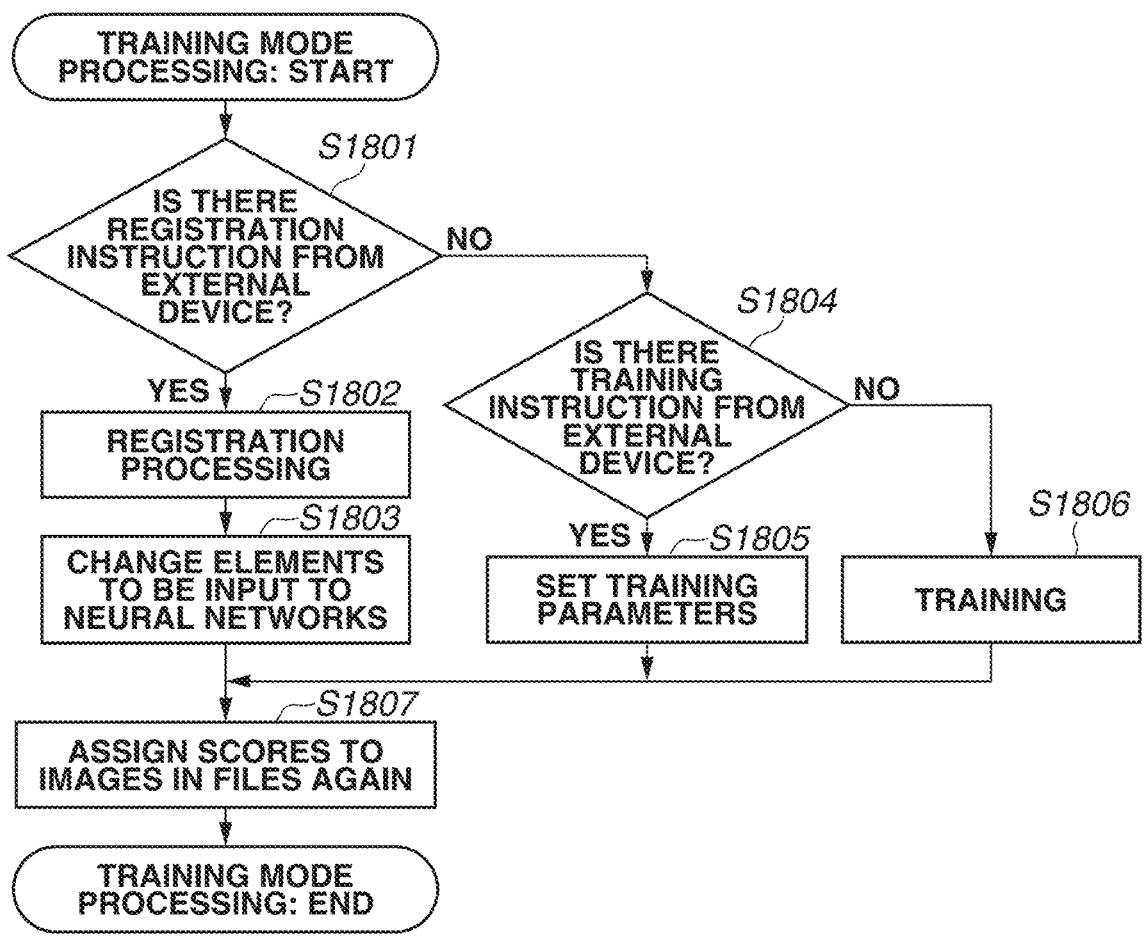
FIG. 18 is a flowchart for illustrating training processing.

Next, processing in the training mode processing (step S716) will be described. FIG. 18 illustrates a detailed flowchart of the training mode processing.

If, in step S715 of FIG. 7, it is determined that the mode setting is the training mode (YES in step S715), the processing proceeds to step S716 and the processing of FIG. 18 starts. In step S1801, the first control unit 223 determines whether there is a registration instruction from the external device 301. In step S1801, if there is a registration instruction from the external device 301 (YES in step S1801), the processing proceeds to step S1802. In step S1802, the first control unit 223 performs various types of registration processing.

Various types of registration processing include registration of features to be input to neural networks, such as registration for face authentication, registration for normal object registration, registration of sound information, and registration of location information.

After the end of the registration processing, the processing proceeds to step S1803. In step S1803, the first control unit 223 changes elements to be input to the neural networks based on the information registered in step S1802.

After the end of the processing of step S1803, the processing proceeds to step S1807. If, in step S1801, there is no registration instruction from the external device 301 (NO in step S1801), the processing proceeds to step S1804. In step S1804, the first control unit 223 determines whether there is a training instruction from the external device 301. If there is a training instruction from the external device 301 (YES in step S1804), the processing proceeds to step S1805. In step S1805, the first control unit 223 sets training parameters (neural network weights) communicated from the external device 301 into respective classifiers. The processing proceeds to step S1807.

In step S1804, if there is no training instruction from the external device 301 (NO in step S1804), the processing proceeds to step S1806. In step S1806, the training processing unit 219 performs training (recalculation of neural network weights). As described with reference to FIG. 17, the processing proceeds to step S1806 on condition that the number DN of pieces of data to be learned exceeds the threshold DT and the classifiers can be retrained. The neural networks are retrained through backpropagation or stochastic gradient descent, whereby the neural network weights are recalculated and the parameters of the classifiers are changed. After the setting of the training parameters, the processing proceeds to step S1807.

In step S1807, the first control unit 223 assigns scores to the images in the files again. In the present exemplary embodiment, the first control unit 223 is configured to assign scores to all the captured images stored in the files (recording medium 221) based on the training results, and then perform automatic editing and/or automatic file deletion based on the assigned scores. If retraining is performed or training parameters are set from the external device 301, the scores for the captured images therefore need to be updated as well. In step S1807, the first control unit 223 then performs recalculation to assign new scores to the captured images stored in the files. After the end of the processing, the training mode processing ends.

In the present exemplary embodiment, a description has been provided of a method for suggesting a video image in line with the user's preferences by scenes likely to be preferred by the user being extracted, features thereof being learnt, and the features being reflected on camera operations such as automatic imaging and automatic editing. However, the present disclosure is not limited to such an application. For example, an exemplary embodiment of the present disclosure may be used to deliberately suggest a video image not in line with the user's own preferences. Examples of the method for implementation is described below.

<Method Using Neural Networks Trained with Preferences>

Neural networks are trained with the user's preferences as described above. If, in step S1208 of the automatic imaging mode processing, the output value of a neural network has a value indicating a difference from the user's preferences that are the teaching data, then automatic imaging is performed. For example, suppose that a neural network is trained to output a high value if features similar to those of teaching images are observed, with images preferred by the user as the teaching images. In such a case, automatic imaging is performed if the output value is rather lower than or equal to a predetermined value. Similarly, the object search processing and the automatic editing processing are performed if the output value of a neural network has a value indicating a difference from the user's preferences that are the teaching data.

<Method Using Neural Networks Trained for Situations not in Line with Preferences>

In this method, neural networks are trained with situations not in line with the user's preferences as teaching data during training processing. For example, in the foregoing training method, manually captured images are used as teaching data since such images are of scenes that the user has captured by preference. On the contrary, in the present example, manually captured images are not used as teaching data. Instead, scenes not having been manually captured for a predetermined time or more are added as teaching data. Alternatively, if teaching data includes scenes having similar features to those of the manually captured images, such scenes may be deleted from the teaching data. Images having different features from those of images obtained by the external communication device may be added to the teaching data. Images having similar features to those of the obtained images may be deleted from the teaching data. In such a manner, data not in line with the user's preferences is accumulated into the teaching data, and the trained neural networks can classify situations not in line with the user's preferences. In automatic imaging, scenes not in line with the user's preferences can be captured through imaging based on the output values of the neural networks. In automatic editing, edited images not in line with the user's preferences can be similarly suggested.

As described above, by deliberately suggesting a video image not in line with the user's own preferences, images are captured at scenes that the user tends to miss manually capturing. This can provide the effect of reducing scene misses. Suggesting capturing of scenes and editing effects not conceived by the user himself/herself can also provide the effects of inspiring the user and expanding the range of preferences.

Combining the foregoing means enables a situation somewhat similar to and partly different from the user's preferences to be suggested. This facilitates adjustment of the degree of matching with the user's preferences. The degree of matching with the user's preferences may be changed based on the mode setting, the states of the various sensors, and/or the state of the detection information.

In the present exemplary embodiment, training is described to be performed inside the imaging apparatus 101. However, similar training effects can be realized by providing the external device 301 with training processing capabilities, communicating data needed for training to the external device 301, and performing training only in the external device 301. In such a case, as described in the foregoing <Training Based on Change of Camera Parameters by External Communication Device> section, parameters, such as the weights of the neural networks trained by the external device 301, may be communicated and set to the imaging apparatus 101 for training.

Both the imaging apparatus 101 and the external device 301 may be provide with training processing capabilities. For example, the external device 301 may communicate its own training information to the imaging apparatus 101 at timing when the imaging apparatus 101 performs the training mode processing of step S716 inside, and the training parameters may be merged for training.

An exemplary embodiment of the present disclosure is not limited to imaging with a digital camera or digital video camera, and may be implemented on imaging apparatuses, such as a surveillance camera, a web camera, and a mobile phone.

According to an exemplary embodiment of the present disclosure, an imaging apparatus and a method for controlling the same that can efficiently detect a scene change can be provided.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-104919, filed May 31, 2018, which is hereby incorporated by reference herein in its entirety.

What is claimed is:

1. An imaging apparatus comprising:
    an imaging unit configured to capture an image; and
    at least one processor configured to function as:
    a generation unit configured to combine a plurality of first images to generate a panoramic image of a wider range than an imaging range of each first image of the plurality of first images, the plurality of first images captured by the imaging unit while an imaging direction is being changed;
    a storage unit configured to store the panoramic image together with information about the imaging direction; and
    a detection unit configured to compare the stored panoramic image and at least one second image captured by the imaging unit, and detect a change in a scene based on a result of the comparison.

2. The imaging apparatus according to claim 1, wherein the detection unit is configured to, in a case where the result of the comparison indicates a difference between the stored panoramic image and the at least one second image is greater than a predetermined threshold, determine that the scene has changed.

3. The imaging apparatus according to claim 1, wherein the at least one processor is further configured to function as a determination unit configured to store a direction of a characteristic object included in the stored panoramic image, and determine a direction in which the imaging unit captures an image based on the stored direction of the characteristic object.

4. The imaging apparatus according to claim 1, wherein the detection unit is configured to compare the stored panoramic image and the at least one second image based on a corresponding position of the stored panoramic image corresponding to an imaging angle of the at least one second image.

5. An imaging apparatus having a first mode and a second mode of reduced power consumption compared to the first mode, the imaging apparatus comprising:
    an imaging unit configured to capture an image; and
    at least one processor configured to function as:
    a generation unit configured to combine a plurality of first images to generate, in the first mode, a panoramic image of a wider range than an imaging range of each first image of the plurality of first images, the plurality of first images captured by the imaging unit while an imaging direction is being changed;
    a storage unit configured to store the panoramic image together with information about the imaging direction; and
    a control unit configured to cause the imaging unit to capture at least one second image, compare the at least one second image and the panoramic image, and control whether to cancel the second mode based on a result of the comparison.

6. The imaging apparatus according to claim 5, wherein the control unit is configured to, in a case where the result of the comparison indicates a difference between the at least one second image and the panoramic image is greater than a predetermined threshold, cancel the second mode.

7. The imaging apparatus according to claim 6, wherein the control unit is configured to perform training based on difference information between the at least one second image and the panoramic image and information about whether imaging is performed after the second mode is cancelled, and change the predetermined threshold based on a result of the training.

8. The imaging apparatus according to claim 5, wherein the at least one processor is further configured to function as a determination unit configured to store a direction of a characteristic object included in a stored panoramic image, and determine a direction in which the imaging unit captures an image based on the stored direction of the characteristic object.

9. The imaging apparatus according to claim 5, wherein the first mode includes a mode for imaging standby.

10. The imaging apparatus according to claim 5, wherein power supply to an image sensor is stopped or suppressed in the second mode.

11. The imaging apparatus according to claim 5, wherein the control unit is configured to, in at least any one of cases where a predetermined vibration is detected, where predetermined sound is detected, and where a predetermined time has elapsed, control whether to cancel the second mode.

12. An imaging apparatus having a first mode and a second mode of reduced power consumption compared to the first mode, the imaging apparatus comprising:
    an imaging unit configured to, in response to a shift from the first mode to the second mode, capture a plurality of first images while changing an imaging direction, and in the second mode, capture at least one second image; and
    at least one processor configured to function as a control unit configured to:
    compare the at least one second image and at least one first image of the plurality of first images; and
    control whether to cancel the second mode based on a result of the comparison.

13. The imaging apparatus according to claim 12, wherein the control unit is configured to, based on the result of the comparison, in a case where a difference between the at least one second image and the at least one first image of the plurality of images is greater than a predetermined threshold, determine that a scene has changed and cancel the second mode, and in a case where the difference is less than or equal to the predetermined threshold, maintain the second mode.

14. The imaging apparatus according to claim 12, wherein the control unit is configured to combine the plurality of first images into a panoramic image, and compare the at least one second image and the panoramic image.

15. The imaging apparatus according to claim 12,
    wherein the plurality of first images is captured images of a vicinity of the imaging apparatus, and
    wherein the control unit is configured to, in comparing the at least one second image and the at least one first image of the plurality of first images, compare the at least one second image and a corresponding portion in the plurality of first images based on azimuth information during imaging.

16. The imaging apparatus according to claim 12, wherein a direction of a characteristic object present in a vicinity of the imaging apparatus is stored in capturing the plurality of first images, and a direction in which the imaging unit captures an image in the second mode is determined based on the stored direction of the characteristic object and a current direction at which the imaging apparatus is facing.

17. The imaging apparatus according to claim 12, wherein the first mode includes a mode for imaging standby.

18. The imaging apparatus according to claim 12, wherein power supply to an image sensor is stopped or suppressed in the second mode.

19. The imaging apparatus according to claim 12, wherein the control unit is configured to, in at least any one of cases where a predetermined vibration is detected, where predetermined sound is detected, and where a predetermined time has elapsed, control whether to cancel the second mode.

20. A method for controlling an imaging apparatus including an imaging unit configured to capture an image, the method comprising:
    combining a plurality of first images to generate a panoramic image of a wider range than an imaging range of each first image of the plurality of first images, the plurality of first images captured by the imaging unit while an imaging direction is being changed;
    storing the panoramic image together with information about the imaging direction;
    comparing the stored panoramic image and at least one second image captured by the imaging unit; and
    detecting a change in a scene based on a result of the comparing.

21. A method for controlling an imaging apparatus having a first mode and a second mode of reduced power consumption compared to the first mode, the imaging apparatus including an imaging unit configured to capture an image, the method comprising:
    combining, in the first mode, a plurality of first images to generate a panoramic image of a wider range than an imaging range of each first image of the plurality of first images, the plurality of first images captured by the imaging unit while an imaging direction is being changed;
    storing the panoramic image together with information about the imaging direction;
    causing the imaging unit to capture at least one second image;
    comparing the at least one second image and the panoramic image; and
    controlling whether to cancel the second mode based on a result of the comparing.

22. A method for controlling an imaging apparatus having a first mode and a second mode of reduced power consumption compared to the first mode, the imaging apparatus including an imaging unit configured to capture an image, the method comprising:
    comparing at least one second image captured by the imaging unit in the second mode and a plurality of first images captured while an imaging direction is being changed in response to a shift from the first mode to the second mode; and
    controlling whether to cancel the second mode based on a result of the comparing.

23. A non-transitory computer-readable storage medium storing a program for causing a computer to perform a method for controlling an imaging apparatus including an imaging unit configured to capture an image, the method comprising:
    combining a plurality of first images to generate a panoramic image of a wider range than an imaging range of each first image of the plurality of first images, the plurality of first images captured by the imaging unit while an imaging direction is being changed;
    storing the panoramic image together with information about the imaging direction;
    comparing the stored panoramic image and at least one second image captured by the imaging unit; and
    detecting a change in a scene based on a result of the comparing.

24. A non-transitory computer-readable storage medium storing a program for causing a computer to perform a method for controlling an imaging apparatus having a first mode and a second mode of reduced power consumption compared to the first mode, the imaging apparatus including an imaging unit configured to capture an image, the method comprising:
    combining, in the first mode, a plurality of first images to generate a panoramic image of a wider range than an imaging range of each first image of the plurality of first images, the plurality of first images captured by the imaging unit while an imaging direction is being changed;
    storing the panoramic image together with information about the imaging direction;
    causing the imaging unit to capture at least one second image;
    comparing the at least one second image and the panoramic image; and
    controlling whether to cancel the second mode based on a result of the comparing.

25. A non-transitory computer-readable storage medium storing a program for causing a computer to perform a method for controlling an imaging apparatus having a first mode and a second mode of reduced power consumption compared to the first mode, the imaging apparatus including an imaging unit configured to capture an image, the method comprising:
    comparing at least one second image captured by the imaging unit in the second mode and a plurality of first images captured while an imaging direction is being changed in response to a shift from the first mode to the second mode; and
    controlling whether to cancel the second mode based on a result of the comparing.

* * * * *